United States Patent [19]

Beers

[11] Patent Number: 4,513,115
[45] Date of Patent: Apr. 23, 1985

[54] LOW MODULUS ONE COMPONENT RTV COMPOSITIONS PROCESSES

[75] Inventor: Dale M. Beers, Schenectady, N.Y.

[73] Assignee: General Electric Company, Waterford, N.Y.

[21] Appl. No.: 512,566

[22] Filed: Jul. 11, 1983

Related U.S. Application Data

[63] Continuation of Ser. No. 349,537, Feb. 17, 1982, abandoned.

[51] Int. Cl.$^3$ .................................................. C08K 5/54
[52] U.S. Cl. ..................................... 524/731; 524/267; 524/425; 524/773; 524/268; 524/310; 528/15; 528/17; 528/19; 528/18; 528/22; 528/21; 528/34; 528/33; 528/901
[58] Field of Search ............... 524/731, 773, 425, 267, 524/268, 310; 528/901, 33, 34, 21, 22, 18, 17, 15, 19

[56] References Cited

U.S. PATENT DOCUMENTS

| | | | |
|---|---|---|---|
| Re. 29,760 | 9/1978 | Brown | 260/46.5 |
| 2,938,009 | 5/1960 | Lucas | 260/46.5 |
| 3,032,528 | 5/1962 | Nitzche et al. | 528/22 |
| 3,035,016 | 5/1962 | Bruner | 260/46.5 |
| 3,065,194 | 11/1962 | Nitzsche et al. | 260/46.5 |
| 3,122,522 | 2/1964 | Brown et al. | 260/46.5 |
| 3,127,363 | 3/1964 | Nitzsche et al. | 260/46.5 |
| 3,133,891 | 5/1964 | Ceyzeriat | 260/46.5 |
| 3,161,614 | 12/1964 | Brown et al. | 260/46.5 |
| 3,296,161 | 1/1967 | Kulpa | 260/46.5 |
| 3,296,195 | 1/1967 | Goossens | 260/46.5 |
| 3,334,067 | 8/1967 | Weyenberg | 260/46.5 |
| 3,382,205 | 5/1968 | Beers | 260/46.5 |
| 3,438,930 | 4/1969 | Beers | 260/46.5 |
| 3,635,743 | 1/1972 | Smith | 260/46.5 |
| 3,674,738 | 7/1972 | Nitche et al. | 528/34 |
| 3,678,003 | 7/1972 | Kaiser et al. | 528/34 |
| 3,686,357 | 8/1972 | Cheeseman | 528/33 |
| 3,689,454 | 9/1972 | Smith et al. | 260/46.5 |
| 3,779,986 | 12/1973 | Smith et al. | 260/46.5 |
| 3,888,815 | 6/1975 | Bessmer et al. | 260/46.5 |
| 4,100,129 | 7/1978 | Beers | 260/46.5 |
| 4,180,642 | 12/1979 | Takago | 260/46.5 |
| 4,247,445 | 1/1981 | Smith et al. | 260/46.5 |
| 4,248,993 | 2/1981 | Takago | 260/46.5 |
| 4,250,290 | 2/1981 | Petersen | 260/46.5 |
| 4,257,932 | 3/1981 | Beers | 260/46.5 |
| 4,261,758 | 4/1981 | Wright et al. | 260/46.5 |
| 4,267,297 | 5/1981 | Hanada et al. | 528/18 |
| 4,273,698 | 6/1981 | Smith, Jr. et al. | 260/46.5 |
| 4,308,372 | 12/1981 | Smith, Jr. et al. | 260/46.5 |
| 4,358,575 | 11/1982 | Lampe et al. | 528/33 |
| 4,395,526 | 7/1983 | White et al. | 528/33 |
| 4,417,042 | 11/1983 | Dziark | 528/18 |

*Primary Examiner*—Melvyn I. Marquis

[57] ABSTRACT

A one-component alkoxy-functional RTV silicone rubber composition which is made shelf-stable by the incorporation of scavengers in the composition to absorb hydroxy groups. The present composition is made low modulus by the incorporation of various additives in the composition such as a trifunctional fluid and a linear diorganopolysiloxane fluid. There is also disclosed the use of sag control additives in the uncured composition to impart to it thixotropic properties.

120 Claims, No Drawings

LOW MODULUS ONE COMPONENT RTV COMPOSITIONS PROCESSES

This application is a continuation of application Ser. No. 349,537, filed 02/17/82, now abandoned.

BACKGROUND OF THE INVENTION

The present invention relates to one-component RTV compositions and processes and more particularly the present invention relates to low modulus alkoxy functional, one-component RTV compositions and processes.

The earliest type of one-component RTV compositions were ones in which a cross-linking agent was an acyloxy-functional silane as disclosed in Ceyzeriat, U.S. Pat. No. 3,133,891 and Bruner, U.S. Pat. No. 3,035,016. Further, the disclosure of Kulpa, U.S. Pat. No. 3,296,161, Goossens, U.S. Pat. No. 3,296,195 and Beers, U.S. Pat. No. 3,438,930, relate to the use of certain self-bonding additives to make such compositions self-bonding. While such acyloxy-functional compositions were fast-curing and had other desirable properties, nevertheless they have two disadvantages. One disadvantage is that they released acetic acid upon curing which was somewhat corrosive. Further, such acetic acid gave off an objectionable odor such that it was somewhat difficult to work with this system within an enclosed environment.

Accordingly, it early became highly desirable to have a non-corrosive, fast-curing, one-component RTV system. The two-component RTV systems as exemplified by Nitzsche et al., U.S. Pat. No. 3,127,363 were non-corrosive. However, such compositions had to be prepared in two packages and mixed immediately prior to application of the system and once they were mixed they had to be used in a short period of time, otherwise the composition would not cure at a sufficiently fast rate. Accordingly, even though such compositions were non-corrosive, nevertheless they require additional labor cost in the application of the system, and once mixed the system had a very poor shelf life.

An early example of such alkoxy-functional composition in the one-component form is to be found in Nitzsche et al., U.S. Pat. No. 3,065,194. However such composition suffered from the fact that there has to be utilized vigorous drying in the preparation of the composition, and that the composition also has a short shelf period. Other alkoxy-functional one-component RTV compositions are to be found in Brown et al., U.S. Pat. No. 3,122,522, and Brown et al., U.S. Pat. No. 3,161,614 or U.S. Pat. No. RE-29760. These compositions were not sufficiently fast-curing, that is, if they cured at all, they would cure at a very slow rate especially after they had been stored for some time, that is a period of a week or more. It was found that such compositions would not cure at a sufficiently fast rate with the normal condensation catalysts that were used in the acyloxy systems.

Accordingly, there was devised various titanium chelate catalysts for such alkoxy-functional, one-component RTV systems. Examples of titanium chelate catalysts in alkoxy one-component RTV systems are to be found in the disclosures of Weyenberg, U.S. Pat. No. 3,334,067, Cooper et al., U.S. Pat. No. 3,542,901 and Smith et al., U.S. Pat. Nos. 3,689,454 and 3,779,896—the last two being assigned to the same assignee as the present invention.

A further example of such systems which were commercialized in one form or another and particularly with various types of additives, are to be found in the disclosure of Beers, U.S. Pat. No. 4,100,129. All the patents referred to in this application are incorporated by reference. This latter patent discloses an alkoxy-functional, one-component RTV system as stated above, which is commercialized and particularly dependent upon a specific type of chelate catalysts to give the composition a sufficient curing rate after the composition had been stored for periods of time, 6 months or more. In the disclosure of U.S. Pat. No. 4,100,129 there is disclosed that alkoxy one-component RTV systems may have in particular a tri-functional containing polysiloxane fluid and a linear trimethylsiloxy dimethylpolysiloxane fluid and various types of adhesion promoters. It is disclosed in this disclosure that various types of adhesion promoters may be utilized with such alkoxy-functional, one-component RTV systems such as silyl isocyanurates and other compounds. However, as stated previously, such compositions still suffer from the fact that they are not sufficiently shelf stable and they are not sufficiently fast-curing.

Another example of a somewhat non-corrosive, one-component RTV system is, for instance, to be found in the disclosure of Beers, U.S. Pat. No. 4,257,932. This patent discloses an acyloxy-functional, one-component RTV system wherein the acyloxy-functional cross-linking agent is preferably methyltris-2-ethylhexanoxysilane. It is disclosed that various additives may be utilized in such systems such as for instance a fluid polysiloxane having a high degree of tri- or tetrafunctionality, a similar fluid as was disclosed in U.S. Pat. No. 4,100,129 as well as a dimethylpolysiloxane fluid. In addition there is disclosed the presence of various additives such as adhesion promoters and other additives. While the system of U.S. Pat. No. 4,257,932 was somewhat non-corrosive, nevertheless since it released an acid, albeit one of high molecular weight, it still was corrosive and still was not as fast-curing as would be desired. Further, in particular, it should be noted its nature of corrosion was such that it would cause discoloration of various substrates and even be somewhat hard to bond to substrates with various types of self-bonding additives. Examples of several self-bonding additives that could be utilized with such a composition is as for instance disclosed in the foregoing U.S. Pat. No. 4,257,932, as well as Mitchell, et al., U.S. Pat. No. 4,273,698 which disclosed the use of various silyl fumarates, silyl maleates, silyl succinates and other compounds as adhesion promoters for such compositions as well as for alkoxy-functional, one-component RTV systems. Another disclosure that deals with the utilization of large amounts of calcium carbonate as a filler in such compositions so as to make them paintable is in Smith et al., U.S. Pat. No. 4,247,445. Another disclosure in this area is Dziark, et al., U.S. Pat. No. 4,308,372. which relates to the prereacted reaction product of the adhesion promoter and the cross-linking agent so as to impart further self stability to the system. However, even with such prereacted systems of cross-linking agent and adhesion promoter, such systems still suffer from shelf stability problems. Another disclosure which is pertinent is Wright et al., U.S. Pat. No. 4,261,758 which deals with the use of polyethers as sag control agents or as agents to make the composition thixotropic by the incorporation in the composition of small amounts of polyethers.

Recently, there has been devised a stable substantially acid-free, one-package moisture curable polyalkoxy-terminated organopolysiloxane system having as a condensation catalyst, preferably a tin compound as disclosed in White et al., U.S. Pat. No. 4,395,526 and Halgren, U.S. Pat. No. 4,377,706. Another relevant patent application in this area is Chung, Ser. No. 338,518, which was filed Jan. 11, 1982 which deals with the utilization of a particular scavenger in such systems, and Lucas et al., Ser. No. 349,538, which was filed on the same date as the present case which deals with the utilization of various types of adhesion promoters in such systems and in the preferred system of the instant case. There is also the patent of Dziark, U.S. Pat. No. 4,417,042 which concerns the use of certain silazanes and silyl-nitrogen polymers as scavengers with a polyalkoxy base organopolysiloxane polymer. These are some of the scavenging systems not in the White et al., U.S. Pat. No. 4,395,526. The Dziark patent, U.S. Pat. No. 4,417,042 was filed on the same date as the present case. The scavengers and RTV system of U.S. Pat. No. 4,417,042 is preferably cured with the additives of the present case although it should be understood that the additives of the pesent case can be used with any of the RTV systems of White et al., U.S. Pat. No. 4,395,526. Substantially, the utilization of certain scavengers in alkoxy-functional, one-component RTV systems so as to remove or tie up most hydroxy groups in the uncured polymer compositions, results in the composition having good shelf stability and a good cure rate even with a tin soap catalyst. Further, the system is non-corrosive.

It was also desirable to make such compositions low modulus, that is that such compositions have a low tensile strength and high elasticity so that they could be utilized in glazing and sealant applications especially in high-rise construction work. It was also desirable to make such composition self-bonding as was disclosed in the foregoing Lucas et al. Ser. No. 349,538. There has been a continuing search for additional self-bonding additives and there has been an attempt to make such compositions as low-modulus as possible which was not the case with the basic system disclosed in White et al., U.S. Pat. No. 4,395,526, which was disclosed above.

Accordingly, it is one object of the present invention to provide for one-component, alkoxy-functional RTV systems, which is self-bonding by the use of novel self-bonding additives.

It is an additional object of the present invention to provide for an alkoxy-functional, one-component RTV system which is low modulus, that is, has a low tensile strength and a very high elongation.

It is still an additional object of the present invention to make one-component RTV systems which are substantially noncorrosive, shelf stable, and which have a low modulus.

It is still a further object of the present invention to make a low cost one-component RTV composition that is low modulus by incorporating various ingredients into the composition.

It is still further an additional object of the present invention to provide a process for producing a one-component RTV system which is non-corrosive, low modulus, low cost and is shelf stable.

These and other objects of the present invention are accomplished by means of the disclosures set forth hereinbelow.

SUMMARY OF THE INVENTION

In accordance with the above objects, there is provided by the present invention a stable, one-package, substantially anhydrous and substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 2 alkoxy radicals; (2) an effective amount of a condensation catalyst; (3) a stabilizing amount of silane scavenger for hydroxy functional groups having the formula,

where $R^1$ is a $C_{(1-8)}$ aliphatic organic radical selected from the group consisting of alkyl, alkylether, alkylester, alkylketone, and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals, and c is a whole number equal to 0 to 3 inclusive, f is an integer equal to 1 to 4 inclusive and the sum of c+f is equal to 1 to 4 inclusive: and (4) where X is enoxy or amido, an effective amount of a curing accelerator selected from the group consisting of substituted guanidines, amines and mixtures thereof, and (5) from 2 to 20 parts by weight per 100 parts by weight of said organopolysiloxane of a first plasticizer fluid polysiloxane containing a high degree of trifunctionality and mixtures of tri- and tetrafunctionality and comprising:

(i) from 5 to 60 mole percent of monoalkylsiloxy or siloxy units or a mixture of such units;

(ii) from 1 to 6 mole percent of trialkylsiloxy units and (iii) from 34 to 94 mole percent of dialkyl siloxy units, said polysiloxane containing from about 0.1 to about 2% by weight of silicone-bonded hydroxyl groups.

The basic ingredient in such compositions is a polyalkoxy-functional diorganopolysiloxane polymer, which is preferably produced first by reacting a trialkoxy silane cross-linking agent such as methyltrimethoxysilane with a silanol terminated diorganopolysiloxane polymer. Then after the two are reacted, preferably in the presence of a condensation catalyst such as hexylamine there is added a scavenger to the system to absorb all the free hydroxy groups, for instance, methanol and then such scavengers act to absorb all the silanol groups and hydroxy groups in the additives that were added to the basic composition. As a result, the composition is shelf-stable.

Further, by the addition of the ingredients disclosed in this application, the composition can be made self-bonding and low modulus as well as thixotropic. Alternatively, this system may be made by mixing a silanol polymer with a cross-linking agent and scavenger at the same time along with other ingredients. However, it is found that a faster curing more shelf-stable system is made by first prereacting the silanol polymer with the cross-linking agent to make the polyalkoxysilane organopolysiloxane and then adding the scavenger to react with residual silanol groups, moisture, and methanol, and then adding the other ingredients. However, if the optimum shelf stability properties and the fast-curing properties are not desired, then the other mixing procedures disclosed in the White et al. patent U.S. Pat. No. 4,395,526 can be utilized.

DESCRIPTION OF PREFERRED EMBODIMENT

The base component in the RTV compositions of the present case (RTV in this application refers to room temperature vulcanizable) comprises a silanol terminated diorganopolysiloxane polymer and preferably one having the formula

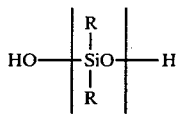
(2)

where R is a $C_{(1-13)}$ monovalent substituted or unsubstituted hydrocarbon radical, which is preferably selected from alkyl radicals of 1 to 8 carbon atoms such as methyl or a mixture of a major amount of methyl and a minor amount of phenyl, cyanoethyl, trifluoropropyl, vinyl, and mixtures thereof and n is an integer having a value of from about 50 to about 2500. Such a silanol polymer may be made by various techniques such as a method of Peterson, U.S. Pat. No. 4,250,290 which is hereby incorporated by reference. Other methods are disclosed, for instance in Lampe, U.S. Pat. No. 3,888,815 which is also incorporated by reference into the present case. Since such polymers are well known, more detail will not be given as to their preparation. There are several definitions used in the present applications such as stable, substantially acid-free, etc.

As utilized hereinafter, the term "stable" as applied to the one-package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

The expression "substantially acid-free" with respect to defining the elastomer made from the RTV composition of the present invention upon exposure to atmospheric moisture, means yielding by-products having a pKa of 5.5 or greater with 6 or greater preferred and 10 or greater being particularly preferred.

Preferably, the silanol terminated diorganopolysiloxane polymer that is utilized in the present invention, whether an alkoxy-terminated polymer or not has a viscosity that varies from 60,000 to 500,000 centipoise at 25° C.

The present invention is based on the discovery of the additives for a stable, substantially acid-free one-package, moisture curable polyalkoxy-terminated organopolysiloxane RTV compositions which can be made by using a silanol terminated polydiorganosiloxane consisting essentially of chemically combined diorganosiloxy units of the formula,

such as silanol-terminated polydiorganosiloxane of Formula (2) where R is as previously defined, with an effective amount of certain silane scavengers for chemically combined hydroxy radicals. In the silanol-terminated polydiorganosiloxane consisting essentially of chemically combined Formula (3) units, the presence of silicon bonded $C_{(1-8)}$ alkoxy radicals such as a methoxy radical is not precluded. The hydroxy radicals which can be removed by the silane scavenger can be found in materials normally present in the RTV composition of the present invention, for example, trace amounts of water, methanol, silanol radicals on the silica filler (if used), the silanol polymer of Formula (2), or a silanol-terminated polymer having Formula (3) units. The silane scavenger useful for eliminating chemically combined hydroxy radicals in accordance with the practice of the invention preferably has the formula,

where $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and defined more particularly below, X is a hydrolyzable leaving group selected from amido, amino, carbamato, enoxy, imidato, isocyanato, oximato, thioisocyanato, and ureido radicals. The preferred members are amino, amido, enoxy, such as for example, N—$C_{(1-8)}$ alkyl $C_{(1-8)}$ acylamido, a is an integer equal to 1 or 2 and preferably 1, b is a whole number equal to 0 or 1 and the sum of a+b is equal to 1 or 2. In Formula (4), where a is 2, X can be the same or different. The leaving group X reacts preferentially before —$OR^1$ with available —OH in the RTV composition and provides an RTV composition substantially free of halogen acid, or carboxylic acid. The silane scavenger of Formula (4) is both the silane scavenger for hydroxy functional groups and a polyalkoxysilane cross-linking agent for terminating the the silicon atoms at each organopolysiloxane chain-end with at least two alkoxy radicals.

Another way of expressing the foregoing invention is by defining the base polyalkoxy polymers. Accordingly, among the ingredients of the present RTV compositions which are formed as a result of the use of the hydroxy scavenger of Formula (4), is silanol-free polydiorganosiloxane, chain-terminated with two or three —$OR^1$ radicals. The silanol-free polydiorganosiloxane optionally can be combined with an effective amount of a cross-linking silane, as defined hereinafter, under substantially anhydrous conditions. The cross-linking polyalkoxysilane which can be utilized in combination with the scavenging silane of Formula (4) has the formula, $$(R^1O)_{4+b}\underset{|}{Si}\overset{(R^2)_b}{} \quad (5)$$

where $R^1$, $R^2$ and b are as previously defined. The preferred condensation catalysts which can be used in the practice of the invention include metal compounds selected from tin compounds, zirconium compounds, and titanium compounds or mixtures thereof. Additional condensation catalysts which can be used are defined more particularly hereinafter.

It is not completely understood why the polyalkoxy-terminated organopolysiloxane compositions of the present invention are stable in the presence of certain condensation catalysts over an extended period of time in the substantial absence of moisture.

It is believed that the reason that the compositions of White et al., U.S. Pat. No. 4,395,526 are stable is the fact that the scavenger ties up all hydroxy groups in the RTV system such that there are no free hydroxy groups in the system which can further cross-link the uncured polymer so as to increase its viscosity and decrease its shelf life while it is being stored. Further, such free hydroxy groups may tend to degrade and degenerate further the alkoxy polymer in the package during storage in various ways.

The use of the silane scavenger for hydroxy of Formulas (1) or (4), in which the leaving group X is not a halogen radical, substantially eliminates undesirable water in the filler and silicone polymer, as well as residual moisture in the RTV composition during the shelf period. In determining what level of silane scavenger of Formula (1) or (4) to use in the practice of the invention, the total hydroxy functionality of the RTV composition can be estimated. The total hydroxy functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to end-stop the polymer. This excess of scavenger can be up to about 3% by weight, based on the weight of the polymer. The aforementioned 3% of scavenger by weight exceeds that amount required to substantially eliminate available hydroxy functionality in the polymer as a result of reaction between OH functionality and X radicals. In compositions which also contain filler and other additives, the additional amount of scavenger of Formulas (1) or (4) which is required is estimated by running a 48-hour stability check at 100° C. to determine whether the tack-free time remains substantially unchanged as compared to the tack-free time of the composition before aging measured under substantially the same conditions.

Where polyalkoxy-terminated polymer of Formula (7) below is made without using silane scavenger of Formula (4), silane scavenger can be used in the practice of the invention having less than two —OR$^1$ radicals attached to silicon, as shown by the formula, $$(R^1O)_{4-(c+d)}\underset{|}{Si}X_d\overset{(R^2)_c}{} \quad (6)$$

where $R^1$, $R^2$, and X are as previously defined, c is a whole number equal to 0 to 3 inclusive, d is an integer equal to 1 to 4 inclusive, and the sum of (c+d) is equal to 3 or 4. In such situations, the scavenging silanes of Formula (6) can be used in an amount sufficient to stabilize the RTV composition as previously defined for the scavenging silane of Formula (4). In addition, there can be used with scavengers of Formulas (4) or (6) at least 0.01 part and up to 10 parts of the cross-linking silane of Formula (5).

The polyalkoxy-terminated organopolysiloxane of the present invention has the formula

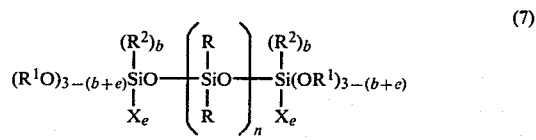

(7)

where R, $R^1$, $R^2$, X, n and b are as previously defined and e is equal to 0 or 1 and the sum of b+e is equal to 0 or 1. The polyalkoxy-terminated organopolysiloxane of Formula (7), can be made by various procedures. One procedure is taught by Cooper et al., U.S. Pat. No. 3,542,901 involving the use of a polyalkoxysilane with a silanol-terminated polydiorganosiloxane in the presence of an amine catalyst as discussed above. A method not taught by Cooper et al. is the use of the silane scavenger of Formula (4) as an end-capper with silanol-terminated polydiorganosiloxane used in the practice of the invention. The additives of the present case are preferably used where the polyalkoxy diorganopolysiloxane of Formula (7) is first formed and then the additives are added.

In Formulas (1–7), R is preferably selected from $C_{(1-13)}$ monovalent hydrocarbon radicals, halogenated hydrocarbon radicals and cyano alkyl radicals, $R^1$ is preferably a $C_{(1-8)}$ alkyl radical or a $C_{(7-13)}$ aralkyl radical, $R^2$ is preferably methyl, phenyl, or vinyl.

The preferred X radicals in Formulas (3), (5), and (6) are amido, amino and enoxy, and the most preferred is amido.

It has been further found that improved cure rates can be achieved if minor amounts of amines, substituted guanidines, or mixtures thereof, are utilized as curing accelerators in the polyalkoxy compositions of the present invention. These curing accelerators also serve to catalyze the ability of the enoxy leaving group to act as a scavenger. There can be used from 0.1 to 5 parts, and preferably from about 0.3 to 1 part of curing accelerator, per 100 parts of the silanol-terminated polymer of Formula (2), or which consists of chemically combined units of Formula (3), or 100 parts of the polyalkoxy-terminated polymer of Formula (7) to substantially reduce the tack-free time (TFT) of the RTV composition of the present invention. This enhanced cure rate is maintained after it has been aged for an extended shelf period, for example 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

It appears that the curing accelerators described herein, in addition to decreasing the tack-free times of the RTV compositions of this invention, also provide a surprising stabilizing effect for particular RTV compositions catalyzed with certain condensation catalysts which exhibit a marked lengthening of tack-free time after accelerated aging. For this class of condensation catalysts, addition of amines, substituted guanidines and mixtures thereof described herein provide stable RTV compositions which exhibit a fast cure rate initially, i.e., less than about 30 minutes which remains substantially unchanged after accelerated aging.

The RTV compositions of the present invention can cure to a depth of about $\frac{1}{8}''$ thickness within 24 hours. Durometer Hardness (Shore A) can then be determined and used to evaluate the cure of the compositions as shown in the examples.

A general way of stating the polymer system of White et al. U.S. Pat. No. 4,395,526 is that there is present a one-package substantially anhydrous room temperature vulcanizable organopolysiloxane composition stable under ambient conditions in the substantial absence of moisture over an extended period of time and convertible to a substantially acid-free, tack-free elastomer comprising: (1) an organopolysiloxane wherein the silicon atom at each polymer chain end is terminated with at least two alkoxy radicals; (2) an effective amount of condensation catalyst; and (3) a stabilizing amount of scavenging silane of the formula,

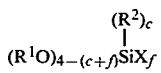

where $R^1$, $R^2$, X and c are as previously defined, f is an integer equal to 1 to 4 inclusive, and the sum of c+f is equal to 1 to 4 inclusive. In addition, an effective amount of a curing accelerator selected from substituted guanidines, amines and mixtures thereof is used.

In a further aspect of the present invention, there is provided a stable room temperature vulcanizable polyalkoxy-terminated organopolysiloxane composition curable under ambient conditions to a tack-free, substantially acid-free elastomer comprising:

(A) 100 parts of a polyalkoxy-terminated organopolysiloxane of Formula (7);

(B) 0 to 10 parts of a cross-linking silane of Formula (5);

(C) an effective amount of condensation catalyst; and (D) a stabilizing amount of scavenging silane of Formula (1).

Also included within the scope of the present case is a method of making a room temperature vulcanizable organopolysiloxane composition under substantially anhydrous conditions utilizing an effective amount of a condensation catalyst with a silanol-terminated organopolysiloxane and a polyalkoxysilane cross-linking agent, the improvement which comprises: (1) adding to the silanol-terminated organopolysiloxane a stabilizing amount of a polyalkoxysilane which is both a scavenger for hydroxy functional groups and a cross-linking agent of the formula,

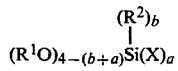

where $R^1$, $R^2$, X, a and b are as previously defined, and thereafter adding an effective amount of a condensation catalyst, whereby improved stability is achieved in the resulting room temperature vulcanizable organopolysiloxane compositions.

Another method of the present case is making a room temperature vulcanizable organopolysiloxane composition under substantially anhydrous conditions utilizing an effective amount of a condensation catalyst with an organopolysiloxane wherein the silicon atom at each polymer chain end is terminated with at least two alkoxy radicals, which involves the improvement which comprises adding to said polyalkoxy-terminated organopolysiloxane (1) a stabilizing amount of a silane scavenger for hydroxy functional groups of the formula,

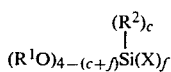

where $R^1$, $R^2$, X, c and f are as previously defined and (2) an effective amount of a condensation catalyst, whereby improved stability is achieved in the resulting room temperature vulcanizable organopolysiloxane composition.

In an additional aspect of the present case, there is provided a method of making a stable, one-package room temperature vulcanizable polyalkoxy-terminated organopolysiloxane composition which comprises agitating, under substantially anhydrous conditions, a room temperature vulcanizable material selected from (i) a mixture comprising on a weight basis
  (a) 100 parts of a silanol-terminated polydiorganosiloxane consisting essentially of chemically combined units of Formula (3);
  (b) an amount of silane of Formula (4) sufficient to scavenge available —OH in the RTV composition and provide up to 3% by weight excess, based on the weight of RTV composition;
  (c) 0 to 10 parts of the cross-linking silane of Formula (5);
  (d) an effective amount of a condensation catalyst, and
  (e) 0 to 5 parts of curing accelerator selected from substituted guanidines, amines and mixtures thereof wherein, the condensation catalyst is added after the silanol-terminated polydiorganosiloxane and scavenging silane are mixed; and (ii) a mixture comprising;
  (a) 100 parts of the polyalkoxy-terminated organopolysiloxane of Formula (7);
  (b) 0 to 10 parts of the cross-linking silane of Formula (5);
  (c) an effective amount of a condensation catalyst;
  (d) a stabilizing amount of silane scavenger of Formula (1), and
  (e) 0 to 5 parts of curing accelerator selected from substituted guanidines, amines, and mixtures thereof.

Radicals included within R of Formulas (2), (3), and (7) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included with $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included with $R^2$ are the same or different radicals included within R radicals. In Formula (1–7), where R, $R^1$, and $R^2$, can be more than 1 radical, these radicals can be the same or different.

Some of the scavengers for chemically combined hydroxy radicals included within one or more of Formula (4), (6), and (1), are for example;

Oximatosilanes such as,
methyldimethoxy(ethylmethylketoximo)silane;
methylmethoxybis-(ethylmethylketoximo)silane;
methyldimethoxy(acetaldoximo)silane.
Carbamatosilanes such as,
methyldimethoxy(N-methylcarbamato)silane;
ethyldimethoxy(N-methylcarbamato)silane.
Enoxysilanes such as,
methyldimethoxyisopropenoxysilane;
trimethoxyisopropenoxysilane;
methyltri-iso-propenoxysilane;
methyldimethoxy(but-2-ene-2-oxy)silane;
methyldimethoxy(1-phenylethenoxy)silane;
methyldimethoxy-2(1-carboethoxypropenoxy)silane.
Aminosilanes such as,
methylmethoxydi-N-methylaminosilane;
vinyldimethoxymethylaminosilane;
tetra-N,N-diethylaminosilane methyldimethoxymethylaminosilane;
methyltricyclohexylaminosilane;
methyldimethoxyethylaminosilane;
dimethyldi-N,N-dimethylaminosilane;
methyldimethoxyisopropylaminosilane dimethyldi-N,N-diethylaminosilane.
Amidosilanes such as,
ethyldimethoxy(n-ethylpropionamido)silane;
methyldimethoxy(N-methylacetamido)silane;
methyltri(N-methylacetamido)silane;
methyltri(N-methylbenzamido)silane;
ethyldimethoxy(N-methylacetamido)silane;
methyltri(N-methylbenzamido)silane;
methylmethoxybis(N-methylacetamido)silane;
methyldimethoxy(caprolactamo)silane;
trimethoxy(N-methylacetamido)silane.
Imidatosilanes such as,
methyldimethoxyethylacetimidatosilane;
methyldimethoxypropylacetimidatosilane.
Ureidosilanes such as,
methyldimethoxy(N,N',N'-trimethylureido)silane;
methyldimethoxy(N-allyl-N',N'-dimethylureido)ilane;
methyldimethoxy(N-phenyl-N',N'-dimethylureidosilane.
Isocyanatosilanes such as,
methyldimethoxyisocyanatosilane;
dimethoxyoxydiisocyanatosilane.
Thioisocyanatosilanes such as,
methyldimethoxythioisocyanatosilane;
methylmethoxydithioisocyanatosilane.

In addition, Formula (6) scavening silanes include silanes such as methyltris(N-methylacetamido)silane; tetra(isopropenoxy)silane. Also included are silanes having different leaving groups such as diethylamino(N-methylcarbamate)isopropenoxy(N-allyl-N',N'-dimethylureido)silane.

Some of the cross-linking polyalkoxysilanes included within Formula (5) are, for example, methyltrimethoxysilane, methyltriethoxysilane, ethyltrimethoxysilane, tetraethoxysilane, vinyltrimethoxysilane, etc.

Among the curing accelerators which can be used in the practice of the invention are silyl substituted guanidines having the formula, $$(Z)_g Si(OR^1)_{4-g} \qquad (8)$$

where $R^1$ is as previously defined, Z is a guanidine radical of the formula,

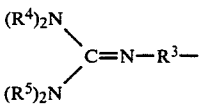

(9)

$R^3$ is divalent $C_{(2-8)}$ alkylene radical, $R^4$ and $R^5$ are selected from hydrogen and $C_{(1-8)}$ alkyl radicals and g is an integer equal to 1 to 3 inclusive. In addition, alkyl substituted guanidines having the formula,

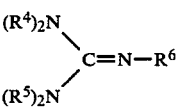

(10)

where $R^4$ and $R^5$ are as previously defined and $R^6$ is a $C_{(1-8)}$ alkyl radical, also can be employed. Some of the silyl substituted guanidines included within Formula (8) are shown by Takago, U.S. Pat. Nos. 4,180,642 and 4,248,993.

In addition to the above substituted guanidines, there can be used various amines, for example, di-n-hexylamine, dichclohexylamine, di-n-octylamine, hexamethoxymethylmelamine, and silylated amines, for example, γ-aminopropyltrimethoxysilane and methyldimethoxydi-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such alkyldialkoxyalkylguanidylsilanes which are useful as cure accelerators herein also act as scavengers and, in certain instances, as stabilizers in the compositions of this invention.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of Formula (1). There are included tin compounds, for example, dibutyltindilauraeate; dibutyltindiacetate; dibutyltindimethoxide; carbomethoxyphenyl tin trisuberate; tin octoate; isobutyl tin triceroate; dimethyl din dibutyrate; dimethyl tin dineodeconoate; triethyl tin tartrate; dibutyl tin dibenzoate; tin oleate; tin napthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg, U.S. Pat.

No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of non-metal condensation catalysts are hexylammonium acetate and benzyltrimethylammonium acetate.

The preferred catalyst for the present compositions is dibutyltindiacetate. However, other tin soaps may be utilized with almost equal effectiveness.

As used hereinafter, the expressions "moisture-free conditions" and "substantially anhydrous conditions," with reference to making the RTV compositions of the present invention, mean mixing in a dry box, or in a closed container which has been subjected to vacuum to remove air, which thereafter is replaced with a dry inert gas, such as nitrogen. Experience has shown that a sufficient amount of silane of Formula (1) should be utilized as previously defined. Temperatures can vary from aout 0 C. to about 180 C. depending upon the degree of blending, the type and amount of filler, a mixture of the silanol terminated polydiorganosiloxane, filler and an effective amount of the scavenging silane of Formula (4) sufficient to effect the substantial elimination of hydroxy functional radicals and to end-cap the polymer. This "end-capping" and scavenging procedure can require several minutes, hours, or even days, depending upon such factors as the nature of the X leaving group, the number of —OR$^1$ radicals on the scavenging silane, etc. There then can be added to the substantially silanol-free mixture, the condensation catalyst, the cross-linking silane, or mixture thereof, along with other ingredients, for example, the curing accelerator and pigments.

A preferred procedure for making the RTV composition of the present invention is to agitate under substantially anhydrous conditions, a mixture of the silanol terminated polydiorganosiloxane, filler and an effective amount of the scavenging silane of Formula (4) sufficient to effect the substantial elimination of hydroxy functional radicals and to end-cap the polymer. This "end capping" and scavenging procedure can require several minutes, hours, or even days, depending upon such factors as the nature of the X leaving group, the number of —OR$^1$ radicals on the scavenging silane, etc. There then can be added to the substantially silanol-free mixture, the condensation catalyst, the cross-linking silane, or mixture thereof, along with other ingredients, for example, the curing accelerator and pigments. A stabilizing excess of the scavenging silane can be used in the initial or final stages of the mixing procedure if desired in amounts previously defined.

In instances where the polyalkoxy-terminated organopolysiloxane of Formula (7) is made by a procedure not requiring the use of scavenging silane of Formula (4), stabilizing amounts of scavenging silane can be added before, with, or after the addition of condensation catalyst. Alternative procedures for making polyalkoxy-terminated organopolysiloxane are shown as previously indicated by Cooper et al. U.S. Pat. No. 3,542,901.

The preferred method of making the RTV compositions of the present case, that is a low modulus non-corrosive, fast-curing composition that is shelf-stable, is to utilize a polyalkoxy-terminated diorganopolysiloxane polymer, that is to form the polyalkoxydiorganopolysiloxane first, remove or scavenge the hydroxy groups in the composition, and then add the other ingredients as desired. This may be done by adding the silanol polymer of Formula (1) to the cross-linking agent of Formula (5), that is prereacting the silanol polymer with a cross-linking agent, and in the presence preferably of a catalyst and preferably an amine catalyst such as hexylamine to produce the desired dialkoxy end-capped polymer and then taking this di- or trialkoxy end-capped polymer and adding a scavenger to it so as to absorb the silanol groups. Then the other ingredients can be added to the composition under substantially anhydrous conditions to prepare a one-component RTV package, which will be shelf stable and will cure at a sufficiently fast rate, that is be fast-curing even with tin soap catalyst in the composition. The first basic ingredient in accordance with the instant invention which should be added to the above RTV system after it has been prepared, that is, the polyalkoxy material, the scavenger and the condensation catalyst is from 2 to 20 parts by weight per 100 parts by weight of diorganopolysiloxane base polymer, (that is either in terms of 100 parts by weight of the silanol polymer of Formula (2) or in terms of 100 parts by weight of the polyalkoxy-terminated organopolysiloxane polymer of Formula (7)) is a first plasticizer fluid polysiloxane containing a high degree of trifunctionality or a mixture of tri- and tetra-functionality and comprising (i) from 5 to 60 mole percent of monoalkylsiloxy, siloxy units or a mixture of such units;

(ii) from 1 to 6 mole percent of trialkylsiloxy units and (iii) from 34 to 94 mole percent of dialkyl siloxy units, said first plasticizer polysiloxane containing from 0.1 to about 2% by weight of silicon-bonded hydroxyl groups.

It should be pointed out that this first plasticizer polysiloxane fluid may be added generally at a concentration of 2 to 20 parts by weight of the base polymer generally, or more preferably a concentration of 5 to 15 parts by weight per 100 parts by weight of a base polymer. Such a polysiloxane functions in the instant composition as a plasticizer and adhesion promoter and more particularly, a plasticizer. Too much of it cannot be added to plasticize the composition, since by itself as a result of its trifunctionality, it will cross-link and unduly increase the viscosity of the system. Above 20 parts by weight per 100 parts of the base polymer is undesirable. Accordingly, generally, it should not be used above 20 parts by weight and below 2 parts by weight it does not have much of an effect.

The highly trifunctional polysiloxane component can be made by means known to those skilled in this art. For example, a mixture of (i) monoalkyltrifluorosilane;

(ii) dialkyldichlorosilane, and (iii) alkyltrichlorosilane, silicone tetrachloride or a mixture thereof, at the appropriate mole ratio can be run into toluene and water to co-hydrolyze them.

Then the mixture can be heated, e.g., at about 60° C. for a time, e.g., 3 hours sufficient to insure completion of the reaction. The oil phase is separated and neutralized, e.g., by washing with an aqueous solution of sodium carbonate or bicarbonate. After filtration to remove insolubles and devolatilization, e.g., by heating at about 140° C. under a vacuum, e.g., about 2 mm or mercury, the fluid polysiloxane component remains as the residue. Preferred for economy's sake is to keep the silicon-bonded hydroxyl content to less than 0.6% by weight to minimize the viscosity of the final composition and to keep the cross-linker level to a minimum. This is done by heating the product at 110° C. in the presence of approximately 1% of sodium carbonate. The water from the silanol condensation can conveniently be removed by azeotropic distillation, e.g., with toluene. After removal of the toluene by distillation, the product is filtered before use. Beers, U.S. Pat. No. 3,382,205 is incorporated for its illustrative teachings.

Preferably, the fluid will have a viscosity in the range of 15 to 300 cps. at 25° C. Preferably, also, in the fluid polysiloxane plasticizer at least 50 percent of the alkyl substituents are methyl and the fluid comprises from 0.2 to 0.6 percent by weight of silanol. Especially, preferably, the monoalkylsiloxy units, siloxy units or mixed such units comprise about 10 to 30 mole percent, the trialkylsiloxy units comprise from 3 to 5 mole percent, the dialkylsiloxy units comprise from 65 to 87 mole percent, and the silanol content is about 0.2 to 0.6 percent by weight.

Accordingly, while such trifunctional fluid will plasticize the base composition so as to make it low modulus, it will not in all cases make it sufficiently low modulus and sufficiently low in viscosity by itself. Accordingly, it is highly desirable there be 100 parts of the base polymer utilized in addition to the trifunctional fluid, from 10 to 50 parts by weight of a second plasticizer per 100 parts of said base organopolysiloxane polymer.

As stated previously, by base organopolysiloxane polymer, it is meant either the silanol terminated diorganopolysiloxane polymer of Formula (2) or the polyalkoxy-terminated diorganopolysiloxane polymer of Formula (7) or various mixtures of both. Since the alkoxy groups add very little to the molecular weight of the polymer, the concentration of the various additives in addition to the trifunctional fluid that will be discussed below will be substantially the same as expressed in terms of either polymer system.

Accordingly, per 100 parts by weight of the base organopolysiloxane polymer there may be utilized from 5 to 60 parts by weight of a second plasticizer which is a linear triorganosiloxy end-stopped diorganopolysiloxane polymer of a viscosity varying from 10 to 20,000 centipoise at 25° C. and in which the organo groups are selected from $C_{(1-8)}$ monovalent hydrocarbon radicals. More preferably, these monovalent hydrocarbon radicals are alkyl radicals of 1 to 8 carbon atoms. Thus, preferably, the second plasticizer has the formula

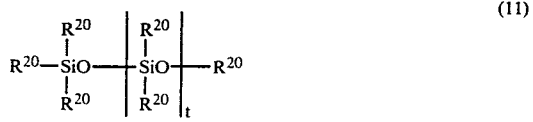
(11)

where $R^{20}$ is a monovalent hydrocarbon radical, preferably an alkyl or phenyl radical of $C_{(1-8)}$ carbon atoms or generally $C_{(1-8)}$ alkyl or aryl radical and t varies such that the viscosity of the polymer varies from 10 to 20,000 centipoise at 25° C. Most preferably, the $R^{20}$ group is methyl and the polymer has a viscosity varying from 10 to 10,000 centipoise at 25° C. more preferably having a viscosity varying from 10 to 1000 centipoise at 25° C. Generally, such polymers by the way they are made have from 500 to 1500 parts per million of silicon as OH. The general process for producing such plasticizer of Formula (11) above is to hydrolyze the appropriate chlorosilanes. Thus, triorganochlorosilane is hydrolyzed with diorganodichlorosilane in water, then the hydrolyzate is removed and purified by decantation and other procedures used to result in the desired linear diorganopolysiloxane polymer of Formula (11). Such a polymer just by this natural hydrolysis method has usually 500 to 1500 parts per million of silanol as OH, and may be further purified by other procedures. However, this is not normally done because of the expense. Further, such silanol groups or hydroxy groups will not cause difficulty in the present situation if there is a scavenger that absorbs substantially all such hydroxy groups that are present in such a polymer. As noted previously, there has to be utilized a scavenger in the instant system that absorbs all the free hydroxy groups in such a plasticizer.

As noted previously, in order to get the Modulus of the composition to a desirably low level, there has to be utilized two plasticizers since the trifunctional fluid alone will not give both the maximum decrease in viscosity and modulus. Thus, if it is desired to obtain the lowest modulus, maximum adhesion and minimum viscosity to increase the ease of application of the sealant, it is necessary to use both plasticizers. Accordingly, the most preferred low modulus, one-component RTV systems of the present case are produced by utilizing the two plasticizers of the present invention in the foregoing proportions shown above. It should be noted that within the above broad range of the second plasticizer of from 5 to 60 parts, there may preferably be utilized a concentration of 20 to 45 parts by weight.

Another aspect of the present composition is low cost. The composition may be made low cost by incorporating in it anywhere from 50 to 300 parts or more by weight per 100 parts of the base organopolysiloxane of an extending filler. An extending filler is desirably in the composition since it lowers the cost of the composition, and adds to the strength of the composition without detracting from its low modulus properties. Most preferably, the filler is calcium carbonate. The most desirable calcium carbonate is the one that is treated with stearic acid. This gives the best flow properties to the uncured composition of the present case and the best low modulus properties specified previously. Other extending fillers may be incorporated into the present composition in the foregoing concentrations of calcium carbonate that have been disclosed above. Thus, other extending fillers and reinforcing fillers that may be utilized in various concentrations, are for example, titanium dioxide, zirconium silicate, silica aerogel, iron oxide, diatomaceous earth, fumed silica, carbon black, precipitated silica, glass fibers, polyvinyl chloride, ground quartz, etc. The amounts of filler used can obviously be varied within wide limits in accordance with the intended use. For example, in some sealant applications, the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 1 to 300 parts of filler, which can include up to about 20 parts of a reinforcing filler, such as fumed silica filler, per 100 parts of silanol-terminated organopolysiloxane is utilized.

However, the fillers utilized at a concentration of 50 to 300 parts by weight should be an extending filler such as calcium carbonate for the low modulus compositions of the present case. In addition to the extending filler, there is utilized from 1 to 50 parts and preferably from 1–10 parts by weight per 100 parts of the base organopolysiloxane polymer of a reinforcing filler. The reinforcing filler may be selected from precipitated silica, and fumed silica, and is most preferably fumed silica. More preferably, there is utilized a fumed silica that is treated either with cyclopolysiloxanes as disclosed in Lucas, U.S. Pat. No. 2,938,009 or with silazanes as disclosed in Smith, U.S. Pat. No. 3,635,743. More preferably, there is utilized from 1 to 10 parts by weight of said treated fumed silica treated with cyclopolysiloxanes. Such fumed silica acts as a sag control agent to make the composition thixotropic. Thixotropic means that the composition when put on a vertical plane will not flow in the uncured state, or will have only minimal flow. Another way of making the composition thioxotropic is as disclosed in Lampe, et al., U.S. Pat. No. 4,261,758 which is hereby incorporated by reference.

Thus, per 100 parts of the base organopolysiloxane polymer with the reinforcing fumed silica, and in addition to the extending filler, there may be incorporated in the RTV composition from 0.1 to 2.0 parts by weight per 100 parts by weight of the organopolysiloxane of a second sag control agent which is a polyether selected from the formulas consisting of

$$A-O-(C_xH_{2x}O)_n-B \quad (12)$$

and

$$[A-O-(C_xH_{2x}O)_n]_yQ_z \quad (13)$$

where A and B represent radicals selected from the class consisting of hydrogen, alkyl radicals containing from 1 to 12 carbon atoms, cyclo alkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

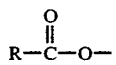
$$\begin{matrix} & O \\ & \| \\ R- & C-O- \end{matrix}$$

where R is alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; x is a number having a value of 2 to 4; y has a value of from 2 to 10; and Z has a value of from 1 to 5; n is an integer equal to from 4 to 2000 the polyether having a molecular weight of from about 300 to about 200,000.

The polyether which is a sag control agent may be utilized in addition to the fumed silica or in place of it to impart thixotropic properties to the uncured RTV composition which is desired in a sealant. It must be noted that the preferred RTV composition of the present case, that is, non-corrosive, low modulus, fast-curing, shelf-stable low modulus is very desirable as a sealant in constructing buildings, in glazing applications and in other manufacturing sealant applications. Accordingly, it is highly desirable that such sealant be thixotropic, that is when it is inserted in the uncured state in a crevice, it will not flow. Such thixotropy may be incorporated in the present composition by the utilization of fumed silica in small quantities in combination with the above polyethers. Further the polyethers are present at preferably from 0.1 to 1.0 parts by weight, in combination with the fumed silica. Although the fumed silica will provide sag control properties to the composition, these properties are considerably enhanced with the incorporation of the polyether. For more information as to the use of the polyethers as a sag control agent, one is referred to the disclosure of Lampe et al., U.S. Pat. No. 4,261,758 which is hereby incorporated by reference.

Examples of commercially available polyethers which may be utilized in the present invention are such polyethers as Pluracol V-7 sold by the Wyandotte Chemicals Corporation, and UCON LB-1145 sold by the Union Carbide Corporation of Connecticut.

In place of both of these sag control agents or in addition to them, there may be utilized per 100 parts by weight of the base organopolysiloxane of from 0.2 to 2.0 parts and more preferably from 0.2 to 1.5 parts by weight of a hydrogenated castor oil.

An example of hydrogenated castor oil that may be utilized as a sag control agent is one known as Thixcin ® (tradename of NL Chemicals, Heightstown, N.J.)

Accordingly, when a hydrogenated castor oil is utilized as a sag control agent, neither the fumed silica or the polyether has to be utilized. However, when the hydrogenated castor oil is not utilized as a sag control agent, then there should be utilized the fumed silica with the polyether. As an alternative the fumed silica or polyether may be used alone. Please note that it must be emphasized that a reinforcing filler is neither necessary nor desired in the present composition since it is desired to make the composition low modulus. A reinforcing filler in large quantities will undesirably increase the modulus of the present composition. Most preferably, the fumed silica if used is used in addition to the extending filler such as calcium carbonate and specifically stearic acid treated calcium carbonate which reduces the cost of the composition, keeps the viscosity of the uncured composition and the modulus of the uncured composition at a low level. There may be added various other types of additives to the composition as they become available or as they are invented.

Thus, there may be incorporated into the present composition per 100 parts of the organopolysiloxane of 0.1 to 10 parts by weight of an adhesion promoter. The present compositions, that is the composition of White et al. U.S. Pat. No. 4,395,526 do not bond very well to substrates. Accordingly, it is desirable to utilize a primer with such compositions or an adhesion promoter. The primers are undesirable in that they add additional labor costs to the application of the sealant. Accordingly, it is highly desirable that there be utilized or incorporated into the composition a self-bonding additive. For instance, note the recitation of self-bonding additives as disclosed in Lucas et al., Ser. No. 349,538 filed on the same day as the present case.

An additional self-bonding additive that may be utilized in the compositions of the present case is one that may be present from 0.1 to 10 parts by weight of an adhesion promoter which has the formula

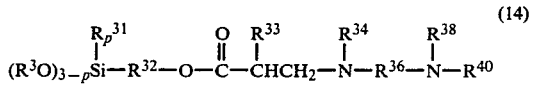
(14)

where $R^{30}$, $R^{31}$ are selected from $C_{(1-8)}$ monovalent hydrocarbon radicals, $R^{32}$, $R^{36}$ are selected from $C_{(1-12)}$ divalent hydrocarbon radicals, $R^{38}$ and $R^{40}$ are selected from the class consisting of hydrogen and $C_{(1-8)}$ monovalent hydrocarbon radicals, $R^{34}$ is selected from hydrogen and $C_{(1-3)}$ alkyl radicals and $R^{33}$ is selected from hydrogen and methyl, and p is a whole number that varies from 0 to 3. Preferably $R^{30}$ and $R^{31}$ are selected from $C_{(1-8)}$ alkyl radicals and most preferably methyl, but they can be any of the radicals previously disclosed for the R radical. In addition, $R^{38}$ and $R^{40}$ may be selected from hydrogen and any of the $C_{(1-8)}$ monovalent hydrocarbon radicals disclosed previously for $R^{30}$ and $R^{31}$. Most preferably, they are selected from $C_{(1-8)}$ alkyl radicals, phenyl radicals and vinyl radicals. Most preferably, $R^{33}$, $R^{34}$, $R^{38}$ and $R^{40}$ are selected from hydrogen or alkyl radicals such as methyl. The specific compound within the above formula which is preferred in the instant invention has the formula

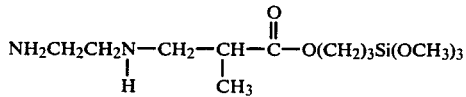

Such compounds may be made by reacting ethylenediamine with the appropriate silylacrylate. Such silylacrylates are well known in the art and can be made by reacting the appropriate olefinic methacrylate compound with a hydrotrialkoxysilane in the presence of a platinum catalyst. The hydrogen of the silane will add onto the olefinic group of the acrylate to produce an acrylate silyl compound, as disclosed, for instance, in the patent application of Keating, Ser. No. 109,727 filed on Jan. 4, 1980, now abandoned. Such reaction takes place in the presence of a platinum catalyst at a temperature anywhere from room temperature to 150° C. with or without a solvent at preferably ambient pressures. Once the acrylate silane is obtained then it can be reacted with appropriate amine in the presence of a solvent without catalyst to produce the desired amine acrylate adduct of Formula (14) above for utilization as an adhesion promoter in the present invention. No catalyst is necessary for such a reaction, and temperatures anywhere from room temperature to 100° C. can be used. Preferably ambient pressures are utilized. The desired amine acrylate adduct is produced in high yields.

This adhesion promoter is one of the adhesion promoters that can be utilized with White et al. U.S. Pat. No. 4,395,526 composition.

For more information as to the preparation of this adhesion promoter one is referred to Mitchell, Ser. No. 349,600, now U.S. Pat. No. 4,472,590 which was filed on the same date as the present application.

Other adhesion promoters as they are developed may be able to be utilized in this composition in addition to the ones disclosed in the prior case of Lucas et al., Ser. No. 349,538 filed on the same date as the present case. It should be noted that the instant composition is low modulus, fast-curing and shelf stable in addition to its other properties and that this low modulus property of the composition is imparted to it by the plasticizers. It is also thixotropic in accordance with the addition of a thixotropic agent disclosed previously and is low cost if the preferred extending filler of the present case is utilized.

Any of the other adhesion promoters that were disclosed in Lucas et al. case, Ser. No. 349,538, or in the present case, may be utilized. In addition, other additives as they are developed may be utilized in the compositions of the present invention.

To produce the low modulus, shelf-stable, fast-curing composition of the present case, it is desirable to form the polyalkoxy diorganopolysiloxane polymer first. This may be done by reacting the silanol polymer with a cross-linking agent of formula (5) in the presence of amine catalyst, preferably hexylamine as disclosed in the foregoing U.S. Pat. No. 4,395,526 and above, and then taking this product, adding the scavenger to it so as to absorb the hydroxy groups. The scavenger is preferably an amine or a silazane. To this there is added the various additives as will be shown in the examples below. By this method, there is then produced a low modulus, one-component RTV system which is low-cost, is thixotropic and can also be made self-bonding. Further, the composition has the properties of being shelf-stable and fast curing as disclosed in White et al., U.S. Pat. No. 4,395,526.

The examples given below are given for the purpose of illustrating the present invention. They are not given for setting limits or boundaries to the instant invention. All parts are by weight.

EXAMPLE 1

There was prepared a base composition comprising 100 parts by weight of a 150,000 centipoise methyldimethoxy-terminated dimethylpolysiloxane polymer, 0.5 parts of di-N-hexylamine, 35 parts by weight of trimethysiloxy end-stopped dimethylpolysiloxane polymer having a viscosity of 100 centipoise at 25° C., 10 parts by weight of a 3 mole percent trimethylsiloxy monofunctional units, 20 mole percent methylsiloxy trifunctional units, and 77 mole percent dimethysiloxy difunctional units having a viscosity of 50 centipoise at 25° C. and 0.5 weight % silanol. There was also mixed in this composition, 130 parts of stearic acid treated calcium carbonate sold under the trade name Hydrocarb 95T from OMYA, Inc. of Vermont, 3 parts of octamethylcyclotetrasiloxane treated fumed silica 0.2 parts of a polyether sold under the trade name of UCON LB-1145 by the Union Carbide Corporation, and 4.2 parts of methyldimethoxy N-methylacetamidosilane. Such composition which was prepared in a substantially anhydrous manner was further mixed with a catalyst in a substantially anhydrous manner in the concentrations shown in Table I below. In Table I are given the flow properties, tack-free time, the application rate and certain physical properties that resulted from such RTV compositions when they were cured. The test for flow properties is determined by the Boeing Test and is as follows. A vertical jig is present with a cylindrical cavity on the top which contains a plunger. The cavity is filled with sealant. The plunger is then pushed level with the surface of the jig. The instrument is then set in a vertical position with the sealant protruding 0.5 inches above the surface. The sag is then measured in terms of tenths of of inches. The cavity is 0.5 inches deep and 1.5 inches in diameter.

The tack-free time is determined by making an approximately one inch by five inch by ⅛ inch smear of the sealant and then determining the time the surface is dry to the touch of the finger.

The application rate is determined by filling a 6 oz. Semco tube affixed with a ⅛ inch diameter orifice. The application rate is then run under 90 psi air pressure as supplied by an air tank. The measurement is made in terms of grams per minute of delivered sealant.

The test results are set forth in Table I below.

TABLE I

|  | A | B |
|---|---|---|
| Base | 100 | 100 |
| Dibutyltindiacetate | 0.4 | 0.4 |
| Methyldimethoxy N—methylacetamido silane | — | 1.0 |
| Flow, inches | 0.5 | 0.05 |
| Tack-free time, minutes | 23 | 20 |
| Application rate, g./min. | 14 | 360 |
| Shore A, hardness | 15 | 18 |
| Tensile, psi | 268 | 275 |
| Elongation, % | 990 | 925 |

EXAMPLE 2

There was prepared a base composition comprising 100 parts by weight of a methyldimethoxy-terminated dimetnylpolysiloxane polymer having a viscosity of 150,000 centipoise at 25° C., 0.5 parts of di-N-hexylamine, 35 parts of 100 centipoise at 25° C. trimethylsiloxy end-stopped dimethylpolysiloxane fluid, 10 parts of the same trifunctional fluid as in Example 1, 130 parts of the same calcium carbonate identified in Example 1, 0.2 parts UCON-LB-1145, and 3.0 parts of octamethylcyclotetrasiloxane treated fumed silica of a surface area of approximately 200 meters square per gram. To this base composition, there was added various amounts of methyldimethoxy N-methylacetamido silane and dibutyl tin acetate as well as a standard amount of adhesion promoter indicated in Table II below. The adhesion promoter had the formula,

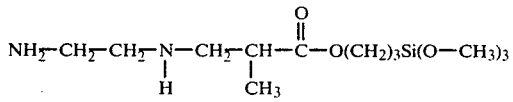

The samples were tested for tack-free time as this test was utilized in Example 1. The results are set forth in Table II below for the various compositions.

TABLE II

|  | A | B | C | D | E | F |
|---|---|---|---|---|---|---|
| Base | 100 | 100 | 100 | 100 | 100 | 100 |
| Methyldimethoxy-N—methyl acetamidosilane | 2.0 | 2.5 | 3.0 | 3.5 | 4.0 | 4.5 |
| Dibutyltindiacetate | 0.3 | 0.3 | 0.3 | 0.3 | 0.3 | 0.3 |
| Adhesion Promoter | 1.0 | 1.0 | 1.0 | 1.0 | 1.0 | 1.0 |
| Initial Durometer | 23 | 24 | 24 | 25 | 27 | 24 |
| 48 hrs./100° C. Durometer | 0 | 0 | 22 | 28 | 27 | 28 |
| Initial Tack Free Time (min.) | 24 | 24 | 25 | 25 | 29 | 43 |
| 48 hrs./100° C. Tack Free Time (min.) | No Cure | No Cure | 20 | 18 | 22 | 31 |

EXAMPLE 3

The same base composition as in Example 2 utilized in this example. This base composition was catalyzed with the scavenger, catalyst system and adhesion promoter with the evaluated tack-free times shown in Table III below.

TABLE III

|  | A | B | C | D | E | F | G | H |
|---|---|---|---|---|---|---|---|---|
| Base | 100 | 100 | 100 | 100 | 100 | 100 | 100 | 100 |
| Hexamethyldisilazane | 1.7 | — | — | — | — | — | — | — |
| t-butoxydimethyl-isopropylaminosilane | — | 3.0 | — | — | — | — | — | — |
| Bis-(dimethylamino)-dimethylsilane | — | — | 1.7 | — | — | — | — | 1.7 |
| Bis-(diethylamino)-dimethylsilane | — | — | — | 1.7 | — | — | — | — |
| Bis-(dimethylamino)-diphenylsilane | — | — | — | — | 2.0 | — | — | — |
| Bis-(monoethylamino)-dimethylsilane | — | — | — | — | — | 1.7 | — | — |
| Bis-(mono-n-butyl-amino)-dimethylsilane | — | — | — | — | — | — | 1.7 |  |
| Adhesion promoter (ethylene-diamine-methacryloxypropyl trimethoxysilane adduct) | 1.0 | 1.0 | 1.0 | 1.0 | 1.0 | 1.0 | 1.0 | — |
| Dibutyltindiacetate | 0.3 | 0.3 | 0.3 | 0.3 | 0.3 | 0.3 | 0.3 | 0.3 |
| Methyltrimethoxysilane | 2.5 | 2.5 | 2.5 | 2.5 | 2.5 | 2.5 | 2.5 | 2.5 |
| Initial durometer | 25 | 25 | 26 | 26 | 26 | 20[1] | 25 | 18[1] |
| 48 hrs./100° C. aging durometer | 27 | 23 | 24 | 27 | 0 | 23 | 26 | 0 |
| Initial TFT - minutes | 26 | 16 | 20 | 21 | 15 | 14 | 14 | 30 |
| 48 hrs./100° C. Aging TFT | 15 | 14 | 14 | 13 | No Cure | 14 | 13 | No Cure |

[1] Air was entrapped in these samples during catalyzation.

The following conclusions that were reached as a result of the above test were that the adhesion promoter (the ethylenediamine-methacryloxypropyltrimethoxysilane adduct) helped stabilize the formulation and that the bis-(dimethylamino)diphenylsilane is a poor scavenger. The remaining materials appear to function effectively as scavengers.

EXAMPLE 4

There was prepared a base compound comprising 100 parts by weight of a methyldimethoxysiloxy-terminated dimethylpopysiloxane polymer of 150,000 centipoise viscosity, at 25° C. in which there was present 0.5 parts of di-n-hexylamine and into which was mixed 35 parts by weight of the same trimethylsiloxy-terminated polydimethylsiloxane polymer of Example 1, 10 parts by weight of the same trifunctional fluid of Example 1, 180 parts by weight of the same stearic acid treated carbonate as Example 1, and 0.2 parts by weight of the UCON LB 1145 . Such base compounds were catalyzed with various amounts of ethylenediamine-methacryloxypropyltrimethoxysilane adduct and dibutyltindiacetate and with various scavengers. The physical properties of the initial samples as well as the tack-free time of the aged samples of the composition with test results are given in Table IV below. The difference in the tack-free time between the initial sample and the one that has been subjected to an accelerating aging is a measure of of the shelf stability of the compound. If the tack-free time does not measurably change after accelerated aging then the compound has good shelf stability. The results may be seen in Table IV below.

EXAMPLE 5

A base compound was prepared as in Example 1 in which the base methyldimethylpolysiloxane polymer was the same as Example 1 in which there was present 0.5 parts of di-n-hexylamine to which was added 15 parts of the same trifunctional fluid as Example 1, 35 parts by weight of the same trimethylsilyl-terminated polydimethylsiloxane as Example 1, 185 parts of the same stearic acid treated calcium carbonate as in Example 1 and 0.2 parts of Pluracol V-7 which is a polyether sag control agent sold by the Wyandotte Chemicals Corporation. As in all the examples, 100 parts of the base compounds were catalyzed with various amounts of scavenger cross-linking agent, condensation catalyst and self-bonding additives in a substantially anhydrous manner. Preferably such mixing in all cases was carried out in a Semco ® pressure mixer in an anhydrous manner. The concentration of the ingredients mixed into the base compound as well as the physical properties obtained from their particular composition are shown in Table V below.

TABLE V

| | A | B | C | D |
|---|---|---|---|---|
| Base | 100 | 100 | 100 | 100 |
| Hexamethyldisilazane | 2.0 | 2.0 | 3.2 | 2.0 |
| Methyltrimethoxysilane | — | 1 | — | 4.0 |
| Dibutyltindiacetate | 0.075 | 0.075 | 0.075 | 0.1 |
| Aminoethylaminopropyltri- | 1.0 | 1.0 | 1.0 | 1.0 |

TABLE IV

| | A | B | C | D | E | F | G | H | I |
|---|---|---|---|---|---|---|---|---|---|
| Base | 100 | 100 | 100 | 100 | 100 | 100 | 100 | 100 | 100 |
| Ethylenediamine-methacryloxypropyltrimethoxysilane adduct | 1.0 | — | 1.0 | — | — | — | — | — | — |
| Dibutyltin-diacetate | 0.3 | 0.3 | 0.3 | 0.3 | 0.3 | 0.3 | 0.3 | 0.3 | 0.3 |
| Methyltrimethoxysilane | 2.5 | 2.5 | 2.5 | 2.5 | 2.5 | 2.5 | 2.5 | 2.5 | 2.5 |
| Bis-(dimethylamino) dimethylsilane | — | 1.7 | 1.7 | 2.2 | 2.7 | 3.2 | 3.2 | — | — |
| Bis-(monoethylamino-dimethylsilane | — | — | — | — | — | — | — | 3.2 | 3.7 |
| *Initial Physics* | | | | | | | | | |
| Tack free time, minutes | 33 | 25 | 26 | 20 | 23 | 22 | 22 | 23 | 21 |
| Shore A, hardness | 34 | 22 | 26 | 21 | 21 | 21 | 20 | 23 | 20 |
| Tensile, psi. | 212 | 157 | 138 | 147 | 133 | 128 | 116 | 105 | 103 |
| Elongation, % | 280 | 390 | 350 | 390 | 390 | 360 | 350 | 380 | 340 |
| *48 hrs./100° C. Accelerated Age* | | | | | | | | | |
| Tack free time, min. | No | No | 23 | No | No | Semi | Semi | 20 | 20 |
| Shore A, hardness | Cure | Cure | 18 | Cure | Cure | Cure | Cure | 23 | 25 |

The data above indicates that low modulus compositions were obtained which had good shelf stability.

The above data also indicates that bis-(dimethylamino)-dimethylsilane is a poor scavenger while the ethylenediaminemethacryloxypropyltrimethoxysilane adduct is not a shelf-stability agent by itself but does promote shelf-stability with a poor scavenger like bis-(dimethylamino)dimethylsilane.

Bis-(monoethylamino)dimethylsilane is an excellent scavenger.

methoxysilane

| Properties | | | | |
|---|---|---|---|---|
| Shore A, hardness | 12 | 25 | 10 | 30 |
| Tensile, psi | 119 | 207 | 103 | 153 |
| Elongation, % | 650 | 410 | 640 | 230 |
| Application rate, g./min. | | | | |
| Tack free time, minutes | | | | |
| (Initial) | 11 | 12 | 10 | 19 |
| (20 hrs./100° C. accelerated) | 13 | 13 | 8 | 18 |
| Peel adhesion, lbs./in., % Cohesive Failure | 7/10* | 8/10 | 28/90 | 56/100 |

TABLE V-continued

|  | A | B | C | D |
|---|---|---|---|---|
| (Concrete) | | | | |

*Semi-cured at interface.

As the results of Table V indicate the composition has good low modulus, good self-bonding properties and good shelf stability. Other conclusions that can be drawn from this data is that the level of trimethylmethoxysilane in the product had a very pronounced effect on the cross-link density as shown by the difference in Durometer measure going from 0 to 1 to 4 parts. The Durometer goes from 12 to 25 to 30. It can also be appreciated that the highest peel adhesion values obtained from concrete are obtained at the 4 part level of the methyltrimethoxysilane.

EXAMPLE 6

There was prepared a base compound comprising 100 parts of the same dimethoxymethylsiloxy-terminated dimethylsiloxane polymer of Example 1, 0.5 parts of di-n-hexylamine 35 parts by weight of a trimethylsiloxy-terminated polydimethylsiloxane of 100 centipoise viscosity at 25° C. of Example 1, 10 parts by weight of the same trifunctional fluid as Example 1, 145 parts of the same stearic acid treated calcium carbonate of Example 1, and 3 parts by weight of the same treated fumed silica as Example 1. A 100 parts of such base compound was catalyzed with various amounts of scavenger, cross-linking agent, catalyst, and self-bonding additives as shown in Table VI below. The physical properties of such examples, shelf-aging properties, that is the tack-free time of such samples, and the peel-adhesion values are shown in Table IV below.

TABLE VI

|  | A | B | C |
|---|---|---|---|
| Base (above) | 100 | 100 | 100 |
| Hexamethyldisilazane | 2.5 | 2.5 | 3.0 |
| Methyltrimethoxysislane | 0.5 | 0.25 | 0.5 |
| Dibutyltindiacetate | 0.075 | 0.075 | 0.075 |
| Aminoethylaminopropyltri-methoxysilane | 1.0 | 1.0 | 1.0 |
| Properties | | | |
| Shore A, hardness | 16 | 15 | 20 |
| Tensile, psi. | 231 | 140 | 194 |
| Elongation, % | 630 | 630 | 570 |
| Application rate, g./min. | 269 | 241 | 313 |
| Tack free time, minutes | 11 | 5 | 6 |
| Peel Adhesion, lbs./in. | | | |
| % Cohesive Failure (Cure 10 days at 50% R.H./77° F.) | | | |
| (1) Anodized aluminum | 43/100 | 42/100 | 47/100 |
| (2) Lexan | 5/5 | 42/100 | 48/95 |
| (3) PVC | 51/100 | 44/100 | 50/100 |
| (4) Glass | | | |
| (5) Polyacrylate | 6/1 | 7/3 | 4/0 |
| (6) Concrete* | 13/90 | 11/95 | 13/93 |
| (7) Andersen Terrestone PVC | 54/100 | 44/100 | 50/100 |

*All of the concrete specimens were semicured at the substrate interface.

EXAMPLE 7

There were prepared a base compound of 100 parts of the same dimethoxymethylsiloxy dimethylsiloxane polymer of Example 1, containing 0.5 parts of di-N-hexylamine 35 parts of the same trimethylsiloxy dimethylpolysiloxane of Example 1, 10 parts of the same tri-functional fluid of Example 1, 140 parts of the same stearic acid treated calcium carbonate of Example 1, 3 parts of the same treated fumed silica of Example 1, and 0.2 parts of polyether sold under the name of Pluracol V-7 by the Wyandotte Chemicals Corporation. To 100 parts of such compound there was added various amounts of scavenger, cross-linking agent, condensation catalyst and self-bonding additive. The physical properties as well as the concentration of ingredients and the peel adhesion results are shown in Table VII below.

TABLE VII

|  | A | B | C |
|---|---|---|---|
| Base II | 100 | 100 | 100 |
| Hexamethyldisilazane | 2.5 | 2.5 | 3.0 |
| Methyltrimethoxysilane | 0.5 | 0.25 | 0.5 |
| Dibutyltindiacetate | 0.075 | 0.075 | 0.075 |
| Aminoethylethylamino-propyltrimethoxysilane | 1.0 | 1.0 | 1.0 |
| Properties | | | |
| Shore A, hardness | 17 | 12 | 16 |
| Tensile, psi. | 199 | 173 | 187 |
| Elongation, % | 600 | 680 | 600 |
| Application rate, g./min. | 294 | 290 | 314 |
| Tack free time, minutes | 5 | 7 | 5 |
| Peel Adhesion, lbs./in - | | | |
| % Cohesive Failure (Cured for ten days 50% R.H./77° F.) | | | |
| (1) Anodized aluminum | 48/100 | 47/100 | 51/100 |
| (2) Lexan | 5/0 | 10/22 | 3/1 |
| (3) PVC | 51/100 | 47/100 | 51/100 |
| (4) Glass | 48/93 | 42/93 | 50/95 |
| (5) Polyacrylate | 4/0 | 5/0 | 3/0 |
| (6) Concrete | 15/93 | 15/97 | 12/95 |
| (7) Andersen Terrastone PVC | 45/100 | 41/100 | 47/100 |

Andersen Terrastone PVC is thin layers of PVC which has been extruded over wood for use as window frames.

The data above indicates the compositions had good self-bonding properties to most substrates and also had a low modulus.

EXAMPLE 8

There was prepared a base compound comprising 100 parts of the methyldimethoxydimethylsiloxane polymer of Example 1, 0.5 parts of di-N-hexylamine 35 parts of a tremethylsiloxy-terminated dimethylpolysiloxane polymer of Example 1, 10 parts of the trifunctional fluid of Example 1, 160 parts of the stearic acid treated calcium carbonate of Example 1, 3 parts of the octamethylcyclotetrasiloxane treated fumed silica of Example 1, and 0.2 parts of Pluracol V-7 of Example 6. This base compound was catalyzed in a substantially anhydrous manner in a Semco® pressure mixer with a scavenger, cross-linking agent condensation catalyst and self-bonding additive, much the same way as the other examples. They physical data that was obtained of the samples, the concentration of ingredients that were utilized to catalyze the base compound as well as the peel adhesion tests are indicated in Table VIII below.

TABLE VIII

|  | Parts | | |
|---|---|---|---|
|  | A | B | C |
| Base | 100 | 100 | 100 |
| Hexamethyldisilazane | 2.5 | 2.5 | 2.5 |
| Methyltrimethoxysilane | 0.25 | 0.70 | 0.70 |
| Dibutyltindiacetate | 0.075 | 0.025 | 0.075 |
| Aminoethylaminopropyltrimethoxy silane | 1.5 | 1.0 | 1.0 |
| Properties | | | |
| Shore A, hardness | 10 | 13 | 24 |
| Tensile, psi | 109 | 172 | 318 |
| Elongation, % | 535 | 470 | 360 |
| Application rate, g./min. | — | — | — |

TABLE VIII-continued

|  | Parts | | |
| --- | --- | --- | --- |
|  | A | B | C |
| Tack free time, minutes | 22 | 27 | 11 |
| Peel Adhesion, lbs./in. | | | |
| % Cohesive Failure (Cured for 10 days 50% R.H./77° F.) | | | |
| (1) Alclad Aluminum | 12/50 | 31/80 | 40/80 |
| (2) Lexan | 15/100 | 41/88 | 44/100 |
| (3) PVC | 14/100 | 42/80 | 46/100 |
| (4) Glass | 14/45 | 42/75 | 47/80 |
| (5) Polyacrylate | 21/93 | 22/35 | 4/0 |
| (6) Concrete | 11/80* | 9/3 | 14/3 |

*Semi-cured sealant observed at substrate interface.

EXAMPLE 9

There were prepared a base compound comprising 100 parts of the same methyldimethoxypolysiloxane polymer of Example 1, 0.5 parts of di-N-hexylamine as in Example 1 10 parts of the same trifunctional fluid of Example 1, 35 parts of the same trimethylsilyl-terminated polydimethylsiloxane of Example 1, 220 parts of stearic acid treated calcium carbonate Hydrocarb 95 T of Example 1, and 3 parts of the treated fumed silica of Example 1. To this base compound, there was added 2.5 parts of hexamethyldisilazane, 0.5 parts of methyltrimethoxysilane, 1.0 parts of amino ethyl aminopropyl trimethoxysilane and 0.07 parts of dibutyltindiacetate. Such mixture of the base compound was prepared and catalyzed in substantially anhydrous state in a continuous Werner-Pfleiderer twin screw extruder. The physical data results of various samples of such compositions is indicated in Table IX below. Table IX below also includes the peel adhesion results of the samples. The results indicated that most samples had good self-bonding properties to a number of substrates, were stable and had the low modulus that is desired in the present invention.

TABLE IX

| Sample No. | 5 | 24 | 44 |
| --- | --- | --- | --- |
| Application rate, g./min. | 258 | 234 | 210 |
| Flow, inches | 0.15 | 0.20 | 0.15 |
| Specific Gravity | 1.52 | 1.52 | 1.53 |
| Tack free time, minutes | 30 | 30 | 30 |
| Shore A, hardness | 16 | 16 | 16 |
| Tensile, psi. | 187 | 184 | 194 |
| Elongation, % | 555 | 565 | 540 |
| Adhesion, lbs./in. (Peel) | Samples 5, 6, 7 | Samples 24, 25, 26 | Samples 44, 45, 46 |
| Concrete | 17/0 | 10/0 | 8/0 |
| Glass | 60/100 | 55/90 | 55/80 |
| PVC (Rigid) | 57/100 | 52/100 | 54/100 |
| Lexan | 52/100 | 48/100 | 51/100 |
| Marviplate* | 58/100 | 53/100 | 58/100 |
| Zincalume | 35/30 | Not tested | 31/100 |
| Anodized aluminum | 55/100 | 55/100 | 52/100 |
| Polyacrylate | 40/30 | 38/30 | 37/30 |

72 hrs./100° C. Accelerated Age
(Samples 24, 25, 26)
Physicals (Sample 25) (Shore A, Tensile and Elongation)

| Samples 24, 25, 26 | Tack Free Time (minutes) | 20, 20, 20 |
| --- | --- | --- |
| | Shore A | 27 |
| | Tensile, psi. | 300 |
| | Elongation, % | 450 |

*A rigid PVC from Australia
**Numbered samples taken during trial run on Werner Pfeiderer mixer.

EXAMPLE 10

There was prepared a base composition having 100 parts of a dimethoxy methylsiloxy terminated polydimethylsiloxane polymer having a viscosity of 150,000 centipoise at 25° C., 0.5 parts of di-n-hexylamine, 180 parts of stearic acid treated calcium carbonate; 35 parts of trimethylsiloxy terminated polydimethylsiloxane fluid having a viscosity of 100 centipoise at 25° C.; 10 parts of the same high trifunctional fluid of the other Examples; and 5.68 parts of Thixcin R (hydrogenated castor oil). To 100 parts of the base composition there was added under substantially anhydrous conditions 2.5 parts of hexamethyldisilazane, 0.5 parts of methyltrimethoxysilane, 1.0 parts of aminoethylaminopropyltrimethoxy silane and 0.05 parts of dibutyltindiacetate. The physical property results are in Table X below.

TABLE X

| Tack-Free Time, minutes | 25 |
| --- | --- |
| Flow, inches | 0.08 |
| Application rate, g./min. | 164 |
| Shore A Durometer | 22 |
| Elongation, % | 435 |
| Tensile, psi | 248 |
| 50% Modulus, psi | 51 |
| 75% Modulus, psi | 62 |
| 100% Modulus, psi | 75 |
| Peel Adhesion (10-day cure) lbs./in. % Cohesive Failure | |
| (1) Anodized Aluminum | 47/100 |
| (2) Lexan (polycarbonate) | 46/100 |
| (3) Rigid PVC (polyvinyl chloride) | 44/100 |
| (4) Glass | 46/100 |

The additives of the present case are preferably used with the RTV compositions of Dziark, Ser. No. 349,695, now U.S. Pat. No. 4,417,042. In one instance, Dziark discloses certain preferred silazane compounds as scavengers for the RTV systems of White et al., Ser. No. 277,524. The preferred systems of Dziark, Ser. No. 349,695 comprise first forming a polyalkoxy diorganopolysiloxane polymer and then having a scavenging compound separate from the cross-linking agent which compound is a silazane monomer or polymer, or certain amine polymeric compounds. It should be noted that the scavengers of Dziark, Ser. No. 349,695, are separate compounds and in addition to the cross-linking agent. The RTV systems as opposted to the scavengers of Dziark Ser. No. 349,695 are disclosed in the White et al., Ser. No. 277,524, now U.S. Pat. No. 4,395,526, in addition to other alkoxy-functional RTV systems. A short synopsis of the Dziark Ser. No. 349,695 system is disclosed below. For more information as to such scavengers and RTV systems one is referred to the disclosure of Dziark, Ser. No. 349,695. In accordance with Dziark, Ser. No. 349,695 the present additives can be utilized with a stable, one-package substantially anhydrous and substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 2 alkoxy radicals; (2) an effective amount of a condensation catalyst; (3) a stabilizing amount of silane scavenger for hydroxy functional groups which is a silicon-nitrogen compound selected from the class consisting of (A) a silicon-nitrogen compound having the formula

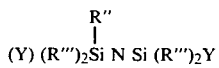

where Y is selected from R''' and $R_2$''N— and (B) a silicon-nitrogen polymer comprising (i) from 3 to 100 mole percent chemically combined structural units selected from the class consisting of units having the formula

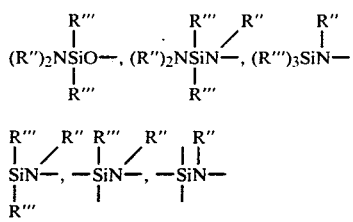

and (ii) from 0 to 97 mole percent chemically combined structural units represented by the formula

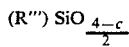

and mixtures thereof where the silicon atoms of said silicon-nitrogen polymer are joined to each other by a member selected from an SiOSi linkage and a SiNR''Si linkage, the free valances of said silicon atoms other than those joined to oxygen to form a siloxy unit and nitrogen to form a silazy unit are joined to a member selected from an R'' radical and (R'')$_2$N radical, and where the ratio of the sum of said R''' radicals and said (R'')$_2$N radical to the silicon atoms of said silicon-nitrogen polymer has a value of 1.5 to 3, inclusive, and R'' is a member selected from the class consisting of hydrogen and monovalent hydrocarbon radicals, and fluoroalkyl radicals, R''' is a member selected from hydrogen, monovalent hydrocarbon radicals and fluoroalkyl radicals, and c is a whole number equal to 0 to 3, inclusive, and (iii) optionally an effective amount of a curing accelerator selected from the group consisting of substituted guanidines, amines and mixtures thereof.

There is present from 0.5 to 10 parts by weight of the silicone scavenger per 100 parts by weight of the organopolysiloxane.

The silazane polymers can include cyclic silazanes of chemically combined

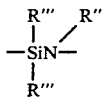

units where R'', R''' are as previously defined to provide for a ratio of 1.5 to 3.0 of the sum of the R''' and (R'')$_2$N radicals per silicon atom in said silazane polymer.

The silazane polymer can comprise linear polymers having at least one unit selected from the class consisting of

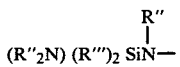

units, and

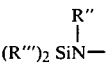

units where R'' and R''' are as defined to provide for a ratio of 1.5 to 3.0 of the sum of the R''' and (R'')$_2$N radicals per silicon atom in said silazane polymer. Further the silazane polymers can comprise linear polymers consisting essentially of

units were R'' and R''' are as defined to provide for a ratio of 1.5 to 3.0 of the sum of the R''' and (R'')$_2$N radicals per silicon atom in said silazane polymer.

The silazane polymers can comprise polymers having at least one unit selected from the class consisting of

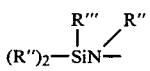

units and

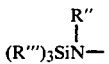

units where R'' and R''' are as previously defined to provide for a ratio of 1.5 to 3 of the sum of the R''' and (R'')$_2$N radicals per silicon atom in said silazane polymer.

In addition, the silazane polymer comprises polymers having a sufficient amount of units selected from

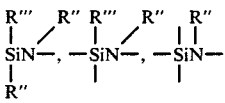

where R'' and R''' are as previously defined to provide for a ratio of 1.5 to 3 of the sum of the R''' and (R'')$_2$N radicals per silicon atom in said silazane polymer.

Also, the silazane-siloxane compounds are copolymers with up to 97 mole percent of

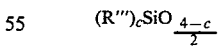

units with most of the units being selected from

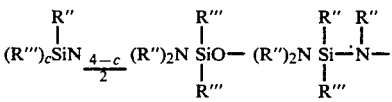

where R'' and R''', and c are as previously defined to provide for a ratio of the sum of R'''+(R'')$_2$N radicals per silicon atom of said silazane-siloxane copolymer of from 1.5 to 3.

The silazane-siloxane compounds can be cyclics such cyclics consisting of chemically combined $(R''')_2SiO$ units and

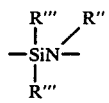

units where R'' and R''' are as previously defined.

Further, the silazane nitrogen compounds are linear and cyclic silazanes having the formula

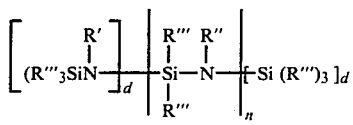

where R'' and R''' are as previously defined where n is a positive whole number and is preferably 0 to 20, inclusive, and d is a whole number equal to 0 to 1, inclusive, and where d is equal to 0, n is preferably equal to 3 to 7, inclusive.

The silazane nitrogen compound can be a polysiloxane having the formula

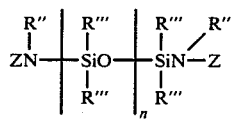

where R'', R''' and n are as defined previously and Z is a number selected from R'' and $-Si(R''')_3$.

Preferred silicon nitrogen compounds are selected from hexamethyldisilazane, hexamethylcyclotrisilazane, octamethylcyclotetrasilazane or silicon nitrogen compounds having the formula $[CF_3CH_2CH_2(CH_3)_2Si]_2NH$ a silicon nitrogen compound having the formula $[CF_3CH_2CH_2(CH_3)SiNH]_3$ and a silicon nitrogen compound having the formula $[CF_3CH_2CH_2(CH_3)_2Si]_2N-CH_3$

What we claim is:

1. A stable, one-package, substantially anhydrous and substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 2 alkoxy radicals; (2) an effective amount of a condensation catalyst; (3) a stabilizing amount of silane scavenger for hydroxy functional groups having the formula

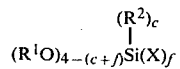

where $R^1$ is a $C_{(1-8)}$ aliphatic organic radical selected from the group consisting of alkyl, alkylether, alkylester, alkylketone, and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino. carbamato, enoxy, imidato, isocyanato, oximato, thioisocyanato, and ureido radicals, and c is a whole number equal to 0 to 3, inclusive, f is an integer equal to 1 to 4 inclusive, and the sum of c+f is equal to 1 to 4 inclusive; and (4) where X is enoxy or amido, an effective amount of a curing accelerator selected from the group consisting of substituted guanidines, amines and mixtures thereof; and (5) from 2 to 20 parts by weight per 100 parts by weight of said organopolysiloxane of a first plasticizer fluid containing a high degree of trifunctionality or mixtures of tri- and tetrafunctionality and comprising (i) from 5 to 60 mole percent of monoalkylsiloxy units, siloxy units or a mixture of such units;

(ii) from 1 to 6 mole percent of trialkylsiloxy units and (iii) from 34 to 94 mole percent of dialkyl siloxy units, said polysiloxane containing from about 0.1 to about 2% by weight of silicone-bonded hydroxyl groups.

2. The composition of claim 1 wherein said organopolysiloxane has a viscosity in the range of 60,000 to 500,000 centipoise at 25 C.

3. The composition of claim 2 wherein there is further present from 5 to 60 parts by weight of a second plasticizer per 100 parts of said organopolysiloxane, said second plasticizer being a linear triorganosiloxy end-stopped diorganopolysiloxane of a viscosity ranging from 10 to 20,000 centipoise at 25° C. and the organo group is a monovalent hydrocarbon radical.

4. The composition of claim 3 wherein said second plasticizer polymer has the formula

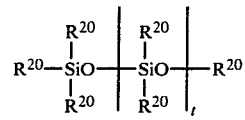

where $R^{20}$ is a monovalent hydrocarbon radical and t varies such that the viscosity of the polymer varies from 10 to 20,000 centipoise at 25° C.

5. The composition of claim 4 wherein $R^{20}$ is methyl and t varies such that the viscosity of the polymer varies from 10 to 10,000 centipoise at 25° C.

6. The composition of claim 4 wherein there is present from 100 to 300 parts by weight per 100 parts of said organopolysiloxane of an extending filler.

7. The composition of claim 6 wherein the extending filler is calcium carbonate.

8. The composition of claim 7 wherein the calcium carbonate is treated with stearic acid.

9. The composition of claim 6 wherein there is present from 1 to 50 parts by weight per 100 parts by weight of said organopolysiloxane of a reinforcing filler.

10. The composition of claim 9 wherein the reinforcing filler is a first sag control agent and is fumed silica which is present at a concentration of 1 to 10 parts by weight per 100 parts of said organopolysiloxane.

11. The composition of claim 10 wherein there is present from 0.1 to 2.0 parts by weight per 100 parts by weight of said organopolysiloxane of a second sag control agent which is a polyether selected from the formulas A—O—(C$_x$H$_{2x}$O)$_n$—B and (A—O—(C$_x$H$_{2x}$O)$_n$)$_y$Q$_z$ where A and B represent radicals selected from the group consisting of hydrogen, alkyl radicals containing from 1 to 12 carbon atoms, cycloalkyl radicals containing 5 to 7 carbon atoms in the ring, mononuclear and binuclear aryl radicals, mononuclear aryl lower alkyl radicals wherein the alkyl groups attached to the aromatic nucleus contain a total of no more than 5 carbon atoms, and $$R-\overset{\overset{O}{\|}}{C}-O-$$

radicals, where R is an alkyl containing from 1 to 11 carbon atoms, Q is a residue of a polyhydric initiator radical containing at least two hydroxyl radicals selected from the group consisting of ethylene glycol, glycerol, trimethylolpropane, and other polyhydric alcohols having from 2 to 6 hydroxyl groups; x is a whole number having a value of from 2 to 4; n is an integer equal to from 4 to 2000; y has a value of from 1 to 5; the polyether having a molecular weight of from about 300 to about 200,000.

12. The composition of claim 6 wherein there is present from 0.2 to 2.0 parts by weight per 100 parts by weight of said organopolysiloxane of a sag control agent which is hydrogenated castor oil.

13. The composition of claim 9 wherein the reinforcing filler is treated with cyclopolysiloxane prior to incorporation in the composition.

14. The composition of claim 1 wherein there is present from 0.1 to 10 parts by weight of an adhesion promoter which has the formula $$(R^{30}O)_{3-p}Si\ R^{32}-O-\overset{\overset{O}{\|}}{C}\ \overset{\overset{R^{33}}{|}}{C}HCH_2-\overset{\overset{R^{34}}{|}}{N}-R^{36}-\overset{\overset{R^{38}}{|}}{N}-R^{40}$$

where $R^{30}$ and $R^{31}$ are selected from $C_{(1-8)}$ monovalent hydrocarbon radicals, $R^{38}$ and $R^{40}$ are selected from the class consisting of hydrogen and $C_{(1-6)}$ monovalent hydrocarbon radicals, $R^{34}$ is selected from hydrogen and $C_{(1-3)}$ alkyl radicals and $R^{33}$ is selected from hydrogen and methyl, $R^{32}$ and $R^{36}$ are selected from $C_{(1-12)}$ divalent hydrocarbon radicals and p is a whole number that varies from 0 to 3.

15. The composition of claim 14 wherein the adhesion promoter has the formula $$NH_2CH_2CH_2\overset{\overset{}{|}}{N}-CH_2-\overset{\overset{}{|}}{C}H-\overset{\overset{O}{\|}}{C}-O(CH_2)_3Si(OCH_3)_3$$
$$\quad\quad\quad\quad\quad\quad H\quad\quad\quad CH_3$$

16. The composition of claim 1 wherein the silane has the formula $$(R^1O)_{4-(b+a)}\overset{\overset{(R^2)_b}{|}}{Si}(X)_a$$

where $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals; and a is an integer equal to 1 to 2 inclusive, b is a whole number equal to 0 to 1 inclusive, and the sum of b+a is equal to 1 to 2 inclusive and the silane is both the silane scavenger for hydroxy functional groups and a polyalkoxysilane cross-linking agent for terminating the silicon atom at each organopolysiloxane chain end with at least two alkoxy radicals.

17. A stable, one-package, substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 2 alkoxy radicals; (2) an effective amount of a condensation catalyst; (3) a stabilizing amount of silane scavenger for hydroxy functional groups having the formula $$(R^1)O_{4-(c+f)}\overset{\overset{(R^2)_c}{|}}{Si}(X)_f$$

where $R^1$ is a $C_{(1-8)}$ aliphatic organic radical selected from the group consisting of alkyl, alkylether, alkylester, alkylketone and alkylcyano radicals, and a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals, and c is a whole number equal to 0 to 3 inclusive, f is an integer equal to 1 to 4 inclusive and the sum of c+f is equal to 1 to 4 inclusive; (4) an effective amount of a curing accelerator selected from the group consisting of substituted guanidines, amines and mixtures thereof; and (5) from 2 to 20 parts by weight per 100 parts by weighy of said organopolysiloxane of a first plasticizer fluid siloxane containing a high degree of trifunctionality or mixtures of tri- and tetrafunctionality and comprising:
  (i) from 5 to 60 mole percent of monoalkylsiloxy units, siloxy units or a mixture of such units;
  (ii) from 1 to 6 mole percent of trialkylsiloxy units and
  (iii) from 34 to 94 mole percent of dialkylsiloxy units, said polysiloxane containing from about 0.1 to about 2% by weight of silicon-bonded hydroxyl groups.

18. The composition of claim 17 wherein said organopolysiloxane has a viscosity in the range of 60,000 to 500,000 centipoise at 25° C.

19. The composition of claim 18 wherein there is further present from 5 to 60 parts by weight of a second plasticizer per 100 parts of said organopolysiloxane, said second plasticizer being a linear triorganosiloxy endstopped diorganopolysiloxane of a viscosity ranging from 10 to 20,000 centipoise at 25° C. and the organo group is a monovalent hydrocarbon radical.

20. The composition of claim 19 wherein said second plasticizer polymer has the formula

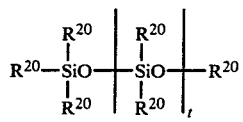

$R^{20}$ is a monovalent hydrocarbon radical and t varies such that the viscosity of the polymer varies from 10 to 20,000 centipoise at 25° C.

21. The composition of claim 20 wherein $R^{20}$ is methyl and t varies such that the viscosity of the polymer varies from 10 to 10,000 centipoise at 25° C.

22. The composition of claim 20 wherein there is present from 100 to 300 parts by weight per 100 parts of said organopolysiloxane of an extending filler.

23. The composition of claim 22 wherein the extending filler is calcium carbonate.

24. The composition of claim 23 wherein the calcium carbonate is treated with stearic acid.

25. The composition of claim 22 wherein there is present from 1 to 50 parts by weight per 100 parts by weight of said organopolysiloxane of a reinforcing filler.

26. The composition of claim 25 wherein the reinforcing filler is a first sag control agent and is fumed silica which is present at a concentration of 1 to 10 parts by weight per 100 parts of said organopolysiloxane.

27. The composition of claim 26 wherein there is present from 0.1 to 2.0 parts by weight per 100 parts by weight of said organopolysiloxane of a second sag control agent which is a polyether selected from the formulas $$A-O-C_xH_{2x}O)_n-B$$

and $$(A-O-C_xH_{2x}O)_{ny}Q_z$$

where A and B represent radicals selected from the group consisting of hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

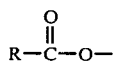

radicals where R is alkyl containing from 1 to 11 carbon atoms, Q is a residue of a polyhydric initiator radical containing at least two hydroxyl radicals selected from the group consisting of ethylene glycol, glycerol, trimethylolpropane, and other polyhydric alcohols having from 2 to 6 hydroxyl groups; x is a whole number having a value from 2 to 4; n is an integer equal to from 4 to 2000; y has a value of from 2 to 10; and z has a value of from 1 to 5, the polyether having a molecular weight of from about 300 to about 200,000.

28. The composition of claim 22 wherein there is present from 0.2 to 2.0 parts by weight per 100 parts by weight of said organopolysiloxane of a sag control agent which is hydrogenated castor oil.

29. The composition of claim 25 wherein the reinforcing filler is treated with cyclopolysiloxane prior to incorporation in the composition.

30. The composition of claim 17 wherein there is present from 0.1 to 10 parts by weight of an adhesion promoter which has the formula

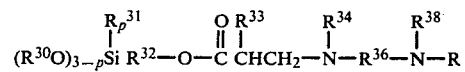

where $R^{30}$ and $R^{31}$ are selected from $C_{(1-8)}$ monovalent hydrocarbon radicals, $R^{32}$ and $R^{36}$ are selected from $C_{(1-12)}$ divalent hydrocarbon radicals, $R^{38}$ and $R^{40}$ are selected from the class consisting of hydrogen and $C_{(1-6)}$ monovalent hydrocarbon radicals, $R^{34}$ is selected from hydrogen and $C_{(1-3)}$ alkyl radicals, $R^{33}$ is selected from hydrogen and methyl, and p is a whole number that varies from 0 to 3.

31. The composition of claim 30 wherein the adhesion promoter has the formula

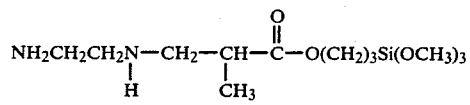

32. A one-package, room temperature vulcanizable polyalkoxy-terminated organopolysiloxane composition in accordance with claim 1, where the polyalkoxy-terminated organopolysiloxane has the formula

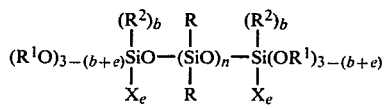

where R is a $C_{(1-13)}$ monovalent substituted or unsubstituted hydrocarbon radical, $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals, and b is a whole number equal to 0 or 1, e is a whole number equal to 0 or 1 inclusive and the sum of b+e is equal to 0 or 1 inclusive, and n is an integer having a value of from about 50 to about 2500 inclusive.

33. A room temperature vulcanizable composition in accordance with claim 1 having an effective amount of a cross-linking silane of the formula

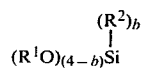

where $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, and b is a whole number equal to 0 or 1.

34. A room temperature vulcanizable composition in accordance with claim 1, where the silane scavenger is methyldimethoxy(N-methylacetamido)silane.

35. A room temperature vulcanizable composition in accordance with claim 1, which contains a tin compound as the condensation catalyst.

36. A room temperature vulcanizable composition in accordance with claim 32 where R, $R^1$ and $R^2$ are methyl and which has a tin compound as a condensation catalyst.

37. A stable, one-package, substantially anhydrous and substantially acid-free room temperature vulcanizable composition in accordance with claim 1 comprising, as the organopolysiloxane, a polymethoxy-terminated polydimethylsiloxane, an effective amount of a tin-containing condensation catalyst, and a stabilizing amount of an alkyldialkoxy-n-dialkylaminosilane or alkyldialkoxyalkylguanidylsilane as both the scavenger and cure accelerator.

38. A stable, one-package, substantially acid-free room temperature vulcanizable composition of claim 33 comprising as the organopolysiloxane, a polymethoxy-terminated polydimethylsiloxane, an effective amount of a tin containing condensation catalyst, an effective amount of trimethoxysilylpropyltetramethylguanidine curing accelerator and a stabilizing amount of a polymethoxyacetamidosilane.

39. An RTV composition in accordance with claim 38 wherein the tin containing condensation catalyst is dibutyltindiacetate.

40. An RTV composition in accordance with claim 33 further comprising a polymethoxysilane cross-linking agent.

41. A stable and substantially acid-free, one-package room temperature vulcanizable polyalkoxy-terminated organopolysiloxane composition curable under ambient conditions to a tack-free elastomer over an extended period of time comprising on a weight basis, (i) 100 parts of a substantially silanol-free polyalkoxysiloxydiorganiopolysiloxane of the formula

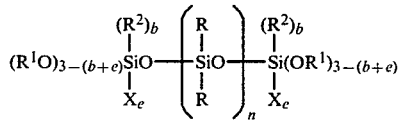

(ii) 0 to 10 parts of a cross-linking polyalkoxysilane of the formula

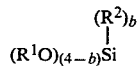

(iii) an effective amount of a condensation catalyst, and (iv) a stabilizing amount of a silane scavenger for hydroxy functional groups having the formula

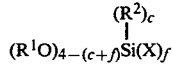

where R is a $C_{(1-13)}$ monovalent substituted or unsubstituted hydrocarbon radical, $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals, and b is a whole number equal to 0 or 1, e is a whole number equal to 0 to 1 inclusive, and the sum of b+e is equal to 0 or 1 inclusive, and n is an integer having a value of from about 50 to about 2500 inclusive, c is a whole number equal to 0 to 3 inclusive, f is an integer equal to 1 to 4 inclusive and the sum of c+f is equal to 4 inclusive; and (v) where X is enoxy or amido, there is present 0.1 to 5 parts of a curing accelerator selected from the group consisting of substituted guanidines, amines, and mixtures thereof, and (vi) from 2 to 20 parts by weight per 100 parts by weight of said organopolysiloxane of a first plasticizer fluid siloxane containing a high degree of trifunctionality or mixtures of tri- and tetra-functionality and comprising (a) from 5 to 60 mole percent of monoalkylsiloxy units, siloxy units or a mixture of such units;

(b) from 1 to 6 mole percent of trialkylsiloxy units and, (c) from 34 to 94 mole percent of dialkyl siloxy units, said polysiloxane containing from about 0.1 to about 2% by weight of silicone-bonded hydroxyl groups.

42. The composition of claim 41 wherein said organopolysiloxane has a viscosity in the range of 60,000 to 500,000 centipoise at 25° C.

43. The composition of claim 42 wherein there is further present from 5 to 60 parts by weight of a second plasticizer per 100 parts of said organopolysiloxane, said second plasticizer being a linear triorganosiloxy endstopped diorganopolysiloxane of a viscosity ranging from 10 to 20,000 centipoise at 25° C. and the organo group is a monovalent hydrocarbon radical.

44. The composition of claim 43 wherein said second plasticizer polymer has the formula

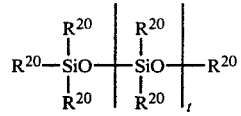

where $R^{20}$ is a monovalent hydrocarbon radical and t varies such that the viscosity of the polymer varies from 10 to 20,000 centipoise at 25° C.

45. The composition of claim 42 wherein $R^{20}$ is methyl and t varies such that the viscosity of the polymer varies from 10 to 10,000 centipoise at 25° C.

46. The composition of claim 44 wherein there is present from 100 to 300 parts by weight per 100 parts of said organopolysiloxane of an extending filler.

47. The composition of claim 46 wherein the extending filler is calcium carbonate.

48. The composition of claim 47 wherein the calcium carbonate is treated with stearic acid.

49. The composition of claim 46 wherein there is present from 1 to 50 parts by weight per 100 parts by weight of said organopolysiloxane of a reinforcing filler.

50. The composition of claim 49 wherein the reinforcing filler is a first sag control agent and is fumed silica which is present at a concentration of 1 to 10 parts by weight per 100 parts of said organopolysiloxane.

51. The composition of claim 50 wherein there is present from 0.1 to 2.0 parts by weight per 100 parts by weight of said organopolysiloxane of a second sag control agent which is a polyether selected from the formulas A—O—C$_x$H$_{2x}$O)$_n$—B and (A—O—C$_x$H$_{2x}$O)$_n$)$_y$Q$_z$ where A and B represent radicals selected from the group consisting of hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms and $$R-\overset{\overset{O}{\|}}{C}-O-$$

radicals, where R is an alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; x is a whole number having a value of 2 to 4; n is an integer equal to from 4 to 2000; y has a value of from 2 to 10; and z has a value of from 1 to 5; the polyether having a molecular weight of from about 300 to about 200,000.

52. The composition of claim 46 wherein there is present from 0.2 to 2.0 parts by weight per 100 parts by weight of said organopolysiloxane of a sag control agent which is a hydrogenated castor oil.

53. The composition of claim 49 wherein the reinforcing filler is treated with cyclopolysiloxane prior to incorporation in the composition.

54. The composition of claim 41 wherein there is present from 0.1 to 10 parts by weight of an adhesion promoter which has the formula $$(R^{30}O)_{3-p}\overset{R_p^{31}}{\underset{|}{Si}} R^{32}-O-\overset{O}{\overset{\|}{C}}\overset{R^{33}}{\underset{|}{C}}HCH_2-\overset{R^{34}}{\underset{|}{N}}-R^{36}-\overset{R^{38}}{\underset{|}{N}}-R^{40}$$

where R$^{30}$ and R$^{31}$ are selected from C$_{(1-8)}$ monovalent hydrocarbon radicals, R$^{32}$ and R$^{36}$ are selected from C$_{(1-12)}$ divalent hydrocarbon radicals, R$^{38}$ and R$^{40}$ are selected from the class consisting of hydrogen and C$_{(1-6)}$ monovalent hydrocarbon radicals, R$^{34}$ is selected from hydrogen and C$_{(1-3)}$ alkylradicals and R$^{33}$ is selected from hydrogen and methyl, and p is a whole number that varies from 0 to 3.

55. The composition of claim 54 wherein the adhesion promoter has the formula $$NH_2-CH_2-CH_2-\underset{\underset{H}{|}}{N}-CH_2-\underset{\underset{CH_3}{|}}{CH}-\overset{O}{\overset{\|}{C}}-O-(CH_2)_3Si(OCH_3)_3$$

56. A one-package, room-temperature vulcanizable composition in accordance with claim 41 where R, R$^1$ and R$^2$ are methyl.

57. A one-package room temperature vulcanizable composition in accordance with claim 41 where the condensation catalyst is a tin compound.

58. A stable and substantially acid-free, one-package, room temperature vulcanizable composition of claim 41 comprising the polyalkoxysiloxy diorganopolysiloxane which is a polymethoxyterminated polydimethylsiloxane, the cross-linking polyalkoxysilane which is a polymethoxysilane, an effective amount of a curing accelerator selected from the group consisting of substituted guanidines, amines and mixtures thereof, an effective amount of a tin compound condensation catalyst, and the stabilizing amount of a silane scavenger for hydroxy-functional groups having at least one hydrolyzable leaving group selected from the group consisting of amido, amino, carbamato, enoxy, imidato, isocyanato, oximato, thioisocyanato and ureido radicals.

59. A one-package room temperature vulcanizable composition in accordance with claim 58 where the polymethoxysilane is methyltrimethoxysilane.

60. A one-package room temperature vulcanizable composition in accordance with claim 58, where the substituted guanidine is butyltetramethylguanidine.

61. A one-package room temperature vulcanizable composition in accordance with claim 58 where the amine is a dialkylamine.

62. A substantially acid-free room temperature vulcanizable composition of claim 1 comprising methyldimethoxysiloxy terminated polydimethylsiloxane, a reinforcing amount of octamethylcyclotetrasiloxane treated silica filler, an effective amount of dibutyltindiacetate condensation catalyst, a cure accelerating amount of trimethoxysilylpropyltetramethylguanidine and an excess of up to 3% by weight, based on the weight of the polydimethylsiloxane of methyldimethoxy-N-methylacetamidosilane.

63. A one package, stable room temperature vulcanizable composition in accordance with claim 1, comprising methyldimethoxysiloxy terminated polydimethylsiloxane, a reinforcing amount of octamethylcyclotetrasiloxane treated silica filler, an effective amount of dibutyltindiacetate condensation catalyst, a cure accelerating amount of trimethoxysilylpropyltetramethylguanidine and an excess of up to 3% by weight, based on the weight of the polydimethyl siloxane of methyldimethoxyisopropenoxysilane.

64. A room temperature vulcanizable composition in accordance with claim 61 having up to 10 parts of methyltrimethoxysilane per 100 parts of the polydimethylsiloxane.

65. A room temperature vulcanizable composition in accordance with claim 61 having an effective amount of di-n-hexylamine curing accelerator.

66. A method of making a one-package and substantially acid-free room temperature vulcanizable composition curable to the solid elastomeric state, which method comprises agitating under substantially anhydrous conditions at a temperature in the range of from 0° C. to 180° C., a room temperature vulcanizable material selected from (i) a mixture comprising
(a) 100 parts of a silanol terminated organopolysiloxane consisting essentially of chemically combined units of the formula

(b) a stabilizing amount of a silane scavenger for hydroxy functional groups of the formula

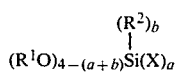

(c) 0 to 10 parts of a cross-linking silane of the formula

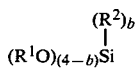

(d) an effective amount of a condensation catalyst, and
(e) where ingredient (b) is enoxy or amido functional, 0.1 to 5 parts of a curing accelerator selected from the group consisting of substituted guanidines, amines and mixtures thereof; and
(ii) a mixture comprising
  (a) 100 parts of a polyalkoxy-terminated organopolysiloxane of the formula

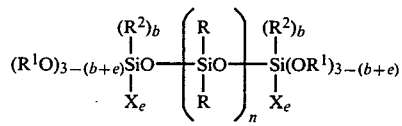

(b) 0 to 10 parts of a cross-linking silane of the formula

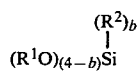

(C) an effective amount of a condensation catalyst;
(d) a stabilizing amount of a silane scavenger for hydroxy functional groups having the formula

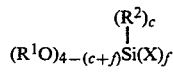

and
(e) where ingredient (d) is enoxy or amido functional, 0.1 to 5 parts of a curing accelerator selected from the group consisting of substituted guanidines, amines and mixtures thereof, where R is selected from $C_{(1-13)}$ monovalent substituted and unsubstituted hydrocarbon radicals, $R^1$ is a $C_{(1-8)}$ aliphatic organic radical selected from the group consisting of alkyl, alkylether, alkylester, alkylketone and alkylcyano radicals, and a $C_{(7-13)}$ aralkyl radical. $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals, and a is an integer equal to 1 or 2, b is a whole number equal to 0 or 1, and the sum of a+b is equal to 1 or 2, e is a whole number equal to 0 or 1 and the sum of b+e is equal to 0 or 1, n is an integer having a value of from about 50 to about 2500 inclusive, c is a whole number equal to 0 to 3 inclusive, f is an integer equal to 1 to 4 inclusive and the sum of c+f equals 1 to 4 inclusive; and (f) from 2 to 20 parts by weight per 100 parts by weight of said organopolysiloxane of a first plasticizer fluid siloxane containing a high degree of trifunctionality of mixtures of tri- and tetrafunctionality comprising
  (i) from 5 to 60 mole percent of monoalkylsiloxy units, siloxy units or a mixture of such units;
  (ii) from 1 to 6 mole percent of trialkylsiloxy units and
  (iii) from 34 to 94 mole percent of dialkylsiloxy units
said first plasticizer fluid containing from about 0.1 to about 2% by weight of silicon-bonded hydroxyl groups.

67. The method of claim 66 wherein said organopolysiloxane has a viscosity in the range of 60,000 to 500,000 centipoise at 25° C.

68. The method of claim 67 wherein there is further present from 5 to 60 parts by weight of a second plasticizer per 100 parts of said organopolysiloxane, said second plasticizer being a linear triorganosiloxy end-stopped diorganopolysiloxane of a viscosity ranging from 10 to 20,000 centipoise at 25° C. and the organo group is a monovalent hydrocarbon radical.

69. The method of claim 68 wherein said second plasticizer polymer has the formula

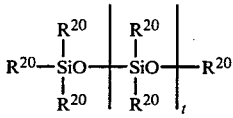

where $R^{20}$ is a monovalent hydrocarbon radical and t varies such that the viscosity of the polymer varies from 10 to 20,000 centipoise at 25° C.

70. The method of claim 69 wherein $R^{20}$ is methyl and t varies such that the viscosity of the polymer varies from 10 to 10,000 centipoise at 25° C.

71. The method of claim 69 wherein there is present from 100 to 300 parts by weight per 100 parts of said organopolysiloxane of an extending filler.

72. The method of claim 71 wherein the extending filler is calcium carbonate.

73. The method of claim 72 wherein the calcium carbonate is treated with stearic acid.

74. The method of claim 71 wherein there is present from 1 to 50 parts by weight per 100 parts by weight of said organo polysiloxane of a reinforcing filler.

75. The method of claim 74 wherein the reinforcing filler is a first sag control agent and is fumed silica which is present at a concentration of 1 to 10 parts by weight per 100 parts of said organopolysiloxane.

76. The composition of claim 75 wherein there is present from 0.1 to 2.0 parts by weight per 100 parts by weight of said organopolysiloxane of a second sag control agent which is a polyether selected from the formulas $$A-O-C_xH_{2x}O)_n-B$$

and $(A-O-C_xH_{2x}O)_n)_yQ_z$ where A and B represent radicals selected from the group consisting of hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms and $$R-\overset{O}{\underset{\|}{C}}-O-$$

radicals, where R is an alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; x is a whole number having a value of 2 to 4; n is an integer equal to from 4 to 2000; y has a value of from 2 to 10; and z has a value of from 1 to 5; the polyether having a molecular weight of from about 300 to about 200,000.

77. The method of claim 71 wherein there is present a sag control agent at a concentration of from 0.2 to 2.0 parts by weight per 100 parts by weight of said organopolysiloxane of a sag control agent which is hydrogenated castor oil.

78. The method of claim 74 wherein the reinforcing filler is treated with cyclopolysiloxane prior to incorporation in the composition.

79. The method of claim 66 wherein there is present from 0.1 to 10 parts by weight of an adhesion promoter which has the formula $$(R^{30}O)_{3-p}\overset{R^{31}_p}{\underset{|}{Si}}-R^{32}O-\overset{O}{\underset{\|}{C}}\overset{R^{33}}{\underset{|}{CHCH_2}}-\overset{R^{34}}{\underset{|}{N}}-R^{36}-\overset{R^{38}}{\underset{|}{N}}-R^{40}$$

where $R^{30}$ and $R^{31}$ are selected from $C_{(1-8)}$ monovalent hydrocarbon radicals, $R^{32}$ and $R^{36}$ are selected from $C_{(1-12)}$ divalent hydrocarbon radicals, $R^{38}$ and $R^{40}$ are selected from the class consisting of hydrogen and $C_{(1-6)}$ monovalent hydrocarbon radicals, $R^{34}$ is selected from hydrogen and $C_{(1-3)}$ alkyl radicals and $R^{33}$ is selected from hydrogen and methyl, and p is a whole number that varies from 0 to 3.

80. The method of claim 79 wherein the adhesion promoter has the formula $$NH_2-CH_2-CH_2-\underset{\underset{H}{|}}{N}-CH_2-\underset{\underset{CH_3}{|}}{CH}-\overset{O}{\underset{\|}{C}}-O-(CH_2)_3Si(OCH_3)_3$$

81. A method in accordance with claim 66 where R, $R^1$ and $R^2$ are methyl.

82. A method in accordance with claim 66 where the curing accelerator is selected from the group consisting of silylated guanidine and alkyl guanidine.

83. A method in accordance with claim 66 where the scavenging silane is a polymethoxyacetamidosilane.

84. A method in accordance with claim 66 where the cross-linking silane is methyltrimethoxysilane.

85. A method in accordance with claim 66 where the condensation catalyst is a tin compound.

86. A method in accordance with claim 85 where the silane scavenger is methyldimethoxy(n-methylacetamido)silane.

87. In the method of making a substantially acid-free room temperature vulcanizable organopolysiloxane composition under substantially anhydrous conditions utilizing an effective amount of a condensation catalyst with an organopolysiloxane wherein the silicon atom at each polymer chain end is terminated with at least two alkoxy radicals, the improvement which comprises adding to said polyalkoxy-terminated organopolysiloxane (1) a stabilizing amount of a silane scavenger for hydroxy functional groups of the formula $$(R^1O)_{4-(c+f)}\overset{(R^2)_c}{\underset{|}{Si}}(X)_f$$

where $R^1$ is a $C_{(1-8)}$ aliphatic organic radical selected from the group consisting of alkyl, alkylether, alkylester, alkylketone and alkylcyano radicals, and a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thiosocyanato and ureido radicals, and c is a whole number equal to 0 to 3 inclusive, f is an integer equal to 1 to 4 inclusive, and the sum of c+f is equal to 1 to 4 inclusive, and (2) an effective amount of a condensation catalyst, whereby improved stability is achieved in the resulting room temperature vulcanizable organopolysiloxane composition, and (3) where X is enoxy amido, adding before or with the scavenger an effective amount of a curing accelerator selected from the group consisting of substituted guanidines, amines and mixtures thereof, and (4) from 2 to 20 parts by weight per 100 parts by weight of said organopolysiloxane of a first plasticizer fluid siloxane containing a high degree of trifunctionality or mixtures of tri- and tetra-functionality and comprising (i) from 5 to 60 mole percent of monoalkylsiloxy, siloxy units or a mixture of such units;
(ii) from 1 to 6 mole percent of trialkylsiloxy units and
(iii) from 34 to 94 mole percent of dialky siloxy units, said polysiloxane containing from about 0.1 to about 2% by weight of silicone-bonded hydroxyl groups.

88. The method of claim 87 wherein said organopolysiloxane has a viscosity in the range of 60,000 to 500,000 centipoise at 25° C.

89. The method of claim 88 wherein there is further present from 5 to 60 parts by weight of a second plasticizer per 100 parts of said organopolysiloxane, said second plasticizer being a linear triorganosiloxy endstopped diorganopolysiloxane of a viscosity ranging from 10 to 20,000 centipoise at 25° C. and the organo group is a monovalent hydrocarbon radical.

90. The method of claim 89 wherein the said second plasticizer polymer has the formula

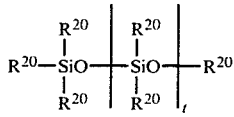

$R^{20}$ is a monovalent hydrocarbon radical and t varies such that the viscosity of the polymer varies from 10 to 20,000 centipoise at 25° C.

91. The method of claim 90 wherein $R^{20}$ is methyl and t varies such that the viscosity of the polymer varies from 10 to 10,000 centipoise at 25°.

92. The method of claim 90 where there is present from 100 to 300 parts by weight per 100 parts of said organopolysiloxane of an extending filler.

93. The method of claim 92 wherein the extending filler is calcium carbonate.

94. The method of claim 93 wherein the calcium carbonate is treated with stearic acid.

95. The method of claim 92 wherein there is present from 1 to 50 parts by weight per 100 parts by weight of said organopolysiloxane of a reinforcing filler.

96. The method of claim 95 wherein the reinforcing filler is a first sag control agent and is fumed silica which is present at a concentration of 1 to 10 parts by weight per 100 parts of said organopolysiloxane.

97. The method of claim 96 wherein there is present from 0.1 to 2.0 parts by weight per 100 parts by weight of said organopolysiloxane of a second sag control agent which is a polyether selected from the formulas

A—O—C$_x$H$_{2x}$O)$_n$—B and

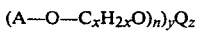

(A—O—C$_x$H$_{2x}$O)$_n$)$_y$Q$_z$ where A and B represent radicals selected from the group consisting of hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms and

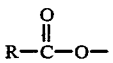

radicals, where R is an alkyl containing from 1 to 11 carbon atoms; Q is a residue of a polyhydric initiator radical containing at least two hydroxyl radicals selected from the class consisting of ethylene gylcol, glycerol, trimethylolpropane, and other polyhydric alcohols having from 2 to 6 hydroxyl groups; x is a whole number having a value of 2 to 4; n is an integer equal to from 4 to 2000; y has a value of from 2 to 10; and z has a value of from 1 to 5; the polyether having a molecular weight of from about 300 to about 200,000.

98. The method of claim 92 wherein there is present a sag control agent at a concentration of from 0.2 to 2.0 parts by weight per 100 parts by weight of said organopolysiloxane and is hydrogenated castor oil.

99. The method of claim 95 wherein the reinforcing filler is treated with cyclopolysiloxane prior to incorporation in the composition.

100. The method of claim 87 wherein there is present from 0.1 to 10 parts by weight of an adhesion promoter which has the formula

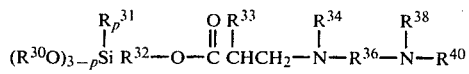

where $R^{30}$ and $R^{31}$ are selected from C$_{(1-8)}$ monovalent hydrocarbon radicals, $R^{32}$ and $R^{36}$ are selected from C$_{(1-12)}$ divalent hydrocarbon radicals, $R^{38}$ and $R^{40}$ are selected from the class consisting of hydrogen and C$_{(1-6)}$ monovalent hydrocarbon radicals, $R^{34}$ is selected from hydrogen and C$_{(1-3)}$ alkyl radicals and $R^{33}$ is selected from hydrogen and methyl, and p is a whole number that varies from 0 to 3.

101. The method of claim 100 wherein the adhesion promoter has the formula

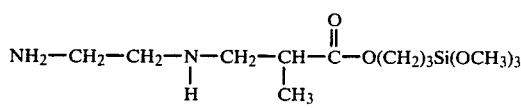

102. A method in accordance with claim 87 where the silane scavenger is methyldimethoxy-N-methylacetamidosilane.

103. A method in accordance with claim 87 where the silane scavenger is methyldimethoxyisopropenoxysilane.

104. A method in accordance with claim 87 utilizing a stabilizing amount of methyltriisopropenoxysilane and an effective amount of methyltrimethoxysilane.

105. A method in accordance with claim 87 using an effective amount of dibutyltindiacetate as the condensation catalyst.

106. A stable, one-package, substantially anhydrous annd substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 2 alkoxy radicals; (2) an effective amount of a condensation catalyst; (3) a stabilizing amount of scavenger for hydroxy functional groups which is a silicon-nitrogen compound selected from the class consisting of (A) a silicon-nitrogen compound having the formula

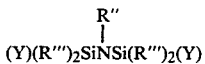

(Y)(R''')$_2$SiNSi(R''')$_2$(Y)

where Y is selected from R''' and (R'')$_2$N and
(B) a silicon-nitrogen polymer comprising (i) from 3 to 100 mole percent chemically combined structural units of the formula

and (ii) from 0 to 97 mole percent chemically combined structural units represented by the formula $$(R''')_c SiO_{\frac{4-c}{2}}$$

where the silicon atoms of said silicon-nitrogen polymer are joined to each by a member selected from an SiOSi linkage and a SiNR''Si linkage, the free valences of said silicon atoms other than those joined to oxygen to form a siloxy unit and to nitrogen to form a silazy unit are joined to a member selected from an R''' radical and an (R'')N radical, and where the ratio of the sum of said R''' radicals and said (R'')$_2$N radicals to the silicon atoms of said silicon-nitrogen polymer has a value of 1.5 to 3 inclusive, and R'' is a member selected from the class consisting of hydrogen, monovalent hydrocarbon radicals and monovalent fluoroalkyl radicals, R''' is a member selected from hydrogen, monovalent hydrocarbon radicals and monovalent fluoroalkyl radicals, and c is a whole number equal to 0 to 3, inclusive, and (4) from 2 to 20 parts by weight per 100 parts by weight of said organopolysiloxane of a first plasticizer fluid polysiloxane containing a high degree of trifunctionality or mixtures of tri- and tetrafunctionality comprising (i) from 5 to 60 mole percent of monoalkylsiloxy units, siloxy units or a mixture of such units; (ii) from 1 to 6 mole percent of trialkylsiloxy units, and (iii) from 34 to 94 mole percent of dialkylsiloxy units, said first plasticizer fluid polysiloxane containing from about 0.1 to about 2% by weight of silicon-bonded hydroxyl groups.

107. The composition of claim 106 wherein said organopolysiloxane has a viscosity in the range of 60,000 to 500,000 centipoise at 25° C.

108. The composition of claim 107 wherein there is further present from 5 to 60 parts by weight of a second plasticizer per 100 parts of said organopolysiloxane, said second plasticizer being a linear triorganosiloxy end-stopped diorganopolysiloxane of a viscosity ranging from 10 to 20,000 centipoise at 25° C. and the organo group is a monovalent hydrocarbon radical.

109. The composition of claim 108 wherein said second plasticizer polymer has the formula

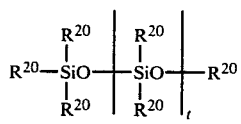

R$^{20}$ is a monovalent hydrocarbon radical and t varies such that the viscosity of the polymer varies from 10 to 20,000 centipoise at 25° C.

110. The composition of claim 104 wherein R$^{20}$ is methyl and t varies such that the viscosity of the polymer varies from 10 to 10,000 centipoise at 25° C.

111. The composition of claim 109 wherein there is present 100 to 300 parts by weight per 100 parts of said organopolysiloxane of an extending filler.

112. The composition of claim 111 wherein the extending filler is calcium carbonate.

113. The composition of claim 112 wherein the calcium carbonate is treated with stearic acid.

114. The composition of claim 111 wherein there is present from 1 to 50 parts by weight per 100 parts by weight of said organopolysiloxane of a reinforcing filler.

115. The composition of claim 114 wherein the reinforcing filler is a first sag control agent and is fumed silica which is present at a concentration of 1 to 10 parts by weight per 100 parts of said organopolysiloxane.

116. The composition of claim 115 wherein there is present from 0.1 to 2.0 parts by weight per 100 parts by weight of said organopolysiloxane of a second sag control agent which is a polyether selected from the formulas $$A-O-C_xH_{2x}O)_n-B$$

and $$(A-O-C_xH_{2x}O)_n)_yQ_z$$

where A and B represent radicals selected from the group consisting of hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms and $$\overset{O}{\underset{\|}{R-C-O-}}$$

radicals, where R is an alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; x is a whole number having a value of 2 to 4; n is an integer equal to from 4 to 2000; y has a value of from 2 to 10; and z has a value of from 1 to 5; the polyether having a molecular weight of from about 300 to about 200,000.

117. The composition of claim 111 wherein there is present from 0.2 to 2.0 parts by weight per 100 parts by weight of said organopolysiloxane of a sag control agent which is hydrogenated castor oil.

118. The composition of claim 114 wherein the reinforcing filler is treated with cyclopolysiloxane prior to incorporation in the composition.

119. The composition of claim 106 wherein there is present from 0.1 to 10 parts by weight of an adhesion promoter which has the formula

where R$^{30}$ and R$^{31}$ are selected from C$_{(1-8)}$ monovalent hydrocarbon radicals, R$^{38}$ and R$^{40}$ are selected from the class consisting of hydrogen and C$_{(1-6)}$ monovalent hydrocarbon radicals, R$^{34}$ is selected from hydrogen and C$_{(1-3)}$ alkoxy radicals and R$^{33}$ is selected from hydrogen and methyl, R$^{32}$ and R$^{36}$ are selected from C$_{(1-12)}$ divalent hydrocarbon radicals and p is a whole number that varies from 0 to 3.

120. The composition of claim 119 wherein the adhesion promoter has the formula

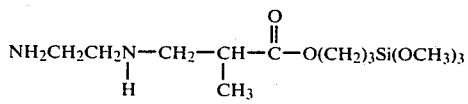

* * * * *